(12) United States Patent
Swaine et al.

(10) Patent No.: US 7,093,236 B2
(45) Date of Patent: Aug. 15, 2006

(54) TRACING OUT-OF-ORDER DATA

(75) Inventors: Andrew Brookfield Swaine, Welwyn Garden City (GB); David James Williamson, Austin, TX (US); Paul Robert Gotch, Cambridge (GB)

(73) Assignee: ARM Limited, Cambridge (GB)

( * ) Notice: Subject to any disclaimer, the term of this patent is extended or adjusted under 35 U.S.C. 154(b) by 899 days.

(21) Appl. No.: 09/773,387

(22) Filed: Feb. 1, 2001

(65) Prior Publication Data

US 2002/0147965 A1    Oct. 10, 2002

(51) Int. Cl.
*G06F 9/44*     (2006.01)
*G06F 11/00*    (2006.01)

(52) U.S. Cl. ......................................... 717/128; 714/45
(58) Field of Classification Search ................ 717/128, 717/124, 127; 714/45, 34, 35, 47; 711/118, 711/119, 133, 138, 140, 159
See application file for complete search history.

(56) References Cited

U.S. PATENT DOCUMENTS

| | | | |
|---|---|---|---|
| 4,439,827 A | | 3/1984 | Wilkes |
| 4,590,550 A | * | 5/1986 | Eilert et al. .................... 714/45 |
| 4,821,178 A | * | 4/1989 | Levin et al. .................... 714/47 |
| 5,151,981 A | * | 9/1992 | Westcott et al. ............... 714/50 |
| 5,265,254 A | * | 11/1993 | Blasciak et al. ............. 717/130 |
| 5,347,647 A | * | 9/1994 | Allt et al. ....................... 714/28 |
| 5,347,652 A | * | 9/1994 | Epstein et al. .................. 707/1 |
| 5,379,432 A | * | 1/1995 | Orton et al. ................. 719/315 |
| 5,541,920 A | * | 7/1996 | Angle et al. ................. 370/429 |
| 5,550,974 A | * | 8/1996 | Pennington et al. ........... 714/42 |
| 5,555,392 A | * | 9/1996 | Chaput et al. ............... 711/118 |
| 5,659,785 A | * | 8/1997 | Pechanek et al. .............. 712/11 |
| 5,745,729 A | * | 4/1998 | Greenley et al. ........... 711/131 |
| 5,802,273 A | | 9/1998 | Levine et al. |
| 5,923,872 A | * | 7/1999 | Chrysos et al. ............. 712/244 |
| 5,978,742 A | * | 11/1999 | Pickerd ........................ 702/66 |
| 5,978,886 A | * | 11/1999 | Moncton et al. ............ 711/118 |
| 5,987,598 A | * | 11/1999 | Levine et al. ................ 712/227 |
| 6,000,044 A | * | 12/1999 | Chrysos et al. ................ 714/47 |
| 6,009,270 A | * | 12/1999 | Mann ........................... 717/128 |
| 6,035,422 A | | 3/2000 | Hohl et al. |
| 6,052,802 A | * | 4/2000 | Zahir et al. .................... 714/47 |
| 6,067,644 A | * | 5/2000 | Levine et al. .................. 714/47 |
| 6,077,311 A | * | 6/2000 | Lichtenstein et al. ........ 717/128 |
| 6,125,400 A | * | 9/2000 | Cohen et al. ................. 709/247 |

(Continued)

FOREIGN PATENT DOCUMENTS

EP           0 324 308           7/1989

(Continued)

OTHER PUBLICATIONS

"ARM966E-S Technical Reference Manual", Dec. 1999, Arm Limited, Issue A, Chapter 1.*

(Continued)

*Primary Examiner*—Tuan Dam
*Assistant Examiner*—J. Derek Rutten
(74) *Attorney, Agent, or Firm*—Nixon & Vanderhye P.C.

(57) ABSTRACT

An integrated circuit is provided with a tracing mechanism that is responsive to data access misses to insert a data place holder within a stream of trace data. When the missed data is later returned, this is inserted into the stream of traced data as a later data value. Analysis of the stream trace data may subsequently correlate between instructions that gave rise to data misses and the late data that was subsequently returned.

24 Claims, 7 Drawing Sheets

```
INSTRUCTION                    DATA
TRACE STREAM              TRACE STREAM

:                         :
       :                         :
30 ⌒ LDR[R1] - - MISS     32 ⌒ DATA PLACE HOLDER TAG 1
       MOV                       —
       CMP                       —
34 ⌒ LDR[R2] - - HIT      36 ⌒ DATA[R2]
38 ⌒ LDR[R3] - - MISS     40 ⌒ DATA PLACE HOLDER TAG 2
       ADD                       —
       MOV                42 ⌒ LATE DATA TAG 2[R3]
       SUB                44 ⌒ LATE DATA TAG 1[R1]
       :                         :
       :                         :
```

U.S. PATENT DOCUMENTS

| | | | |
|---|---|---|---|
| 6,134,652 A | | 10/2000 | Warren |
| 6,139,198 A | * | 10/2000 | Danforth et al. ............ 717/128 |
| 6,175,913 B1 | | 1/2001 | Chesters et al. |
| 6,247,097 B1 | * | 6/2001 | Sinharoy .................... 711/125 |
| 6,374,367 B1 | | 4/2002 | Dean et al. |
| 6,415,378 B1 | * | 7/2002 | Davidson et al. ........... 712/207 |
| 6,539,502 B1 | * | 3/2003 | Davidson et al. ............. 714/47 |
| 6,574,727 B1 | * | 6/2003 | Davidson et al. ........... 712/227 |
| 6,681,321 B1 | * | 1/2004 | Dale et al. ................. 712/227 |

FOREIGN PATENT DOCUMENTS

| | | |
|---|---|---|
| EP | 0 465 765 | 1/1992 |
| EP | 0 503 514 | 9/1992 |
| EP | 0 689 141 | 12/1995 |
| EP | 0 919 919 | 6/1999 |
| GB | 2 307 072 | 5/1997 |
| JP | 62-40538 | 2/1987 |

OTHER PUBLICATIONS

"Embedded Trace Macrocell Architecture Specification", Dec. 2002, Arm Limited, Issue I, Chapters 1 and 2 and Appendix B.*

Uhlig and Mudge, "Trace-Driven Memory Simulation: A Survey", Jun. 1997, ACM Computing Surveys, vol. 29, No. 2, pp. 128-170.*

Uhlig and Mudge, "Trace-driven memory simulation: a survey", Jun. 1997, ACM Computing Surveys (CSUR), vol. 29, Issue 2, pp. 128-170.*

Larus, "Efficient Program Tracing", May 1993, Computer, vol. 26, Issue 5, pp. 52-61.*

U.S. Appl. No. 09/792,643, filed Feb. 26, 2001.

U.S. Appl. No. 09/876,220, filed Jun. 8, 2001.

ARM IHI 0014 Revision C—Embedded Trace Macrocell Specification.

ARM DDI 0157F-ETM9 (Rev. 1) Technical Reference Manual, Rev. r2P2 Aug. 2002.

ARM DDI 0158D-ETM7 (Rev. 1) Technical Reference Manual, Jun. 2001.

ARM IHI 0014 Revision I—Embedded Trace Macrocell Spec.

John Hennessy et al., Computer Organization and Design, The Hardware/Software Interface, Morgan Kaufman Publishers, Inc. Second Edition, 1998, p. 351.

* cited by examiner

| INST | HIT / MISS | DATA |
|---|---|---|
| 18 — LDR[Rm] | HIT | DATA[Rm] |
| MOV | N / A | — |
| CMP | N / A | — |
| ⋮ | ⋮ | ⋮ |
| 20 — LDR[Rm] | MISS | — |
| MOV | N / A | — |
| CMP | N / A | DATA[Rm] |
| ⋮ | ⋮ | ⋮ |
| 22 — LDR[R1] | MISS | — |
| 24 — LDR[R2] | MISS | — |
| MOV | N / A | — |
| CMP | N / A | 28 — DATA[R2] |
| ADD | N / A | 26 — DATA[R1] |

VARIABLE DELAY

MISSED DATA RETURNED OUT OF OTDER

INSTRUCTION TRACE STREAM

⋮

30 — LDR[R1] - - MISS
MOV
CMP
34 — LDR[R2] - - HIT
38 — LDR[R3] - - MISS
ADD
MOV
SUB

⋮

DATA TRACE STREAM

⋮

32 — DATA PLACE HOLDER TAG 1
—
—
36 — DATA[R2]
40 — DATA PLACE HOLDER TAG 2
—
42 — LATE DATA TAG 2[R3]
44 — LATE DATA TAG 1[R1]

INSTRUCTION TRACE STREAM

⋮

46 — LDR[R1] - - MISS
CMP
ADD
LDR[R2] - - HIT
50 — LDR[R3] - - MISS
SUB
MOV
36 — LDR[R4] - - MISS
CMP
MOV

⋮

DATA TRACE STREAM

⋮

48 — DATA PLACE HOLDER 0 PENDING
—
—
DATA[R2]
52 — DATA PLACE HOLDER 1 PENDING
54 — LATE DATA[R1]
—
58 — DATA PLACE HOLDER 1 PENDING
LATE DATA[R3]
LATE DATA[R4]

| EXACT MATCH | ADD MATCH | DATA MATCH | TRACE ACTIVATION POINT |
|---|---|---|---|
| ✓ | ✓ | ✓ | ① |
| ✓ | ✓ | ✗ | NONE |
| ✗ | ✓ | ✓ | ② |
| ✗ | ✓ | ✗ | ② |

TRACING OUT-OF-ORDER DATA

BACKGROUND OF THE INVENTION

1. Field of the Invention

This invention relates to data processing systems. More particularly, this invention relates to data processing systems providing tracing mechanisms to enable data accesses to be traced.

2. Description of the Prior Art

As data processing systems increase in complexity whilst it is desired to also reduce development time for new systems, there is a need to improve the debug and tracing tools and mechanisms that may be used within the development of data processing systems. Tracing the activity of a data processing system whereby a trace stream is generated including data representing the step-by-step activity within the system is a highly useful tool in system development. However, with the general move towards more deeply embedded cores, it becomes more difficult to track the state of the core via externally accessible pins. Accordingly, as well as off-chip tracing mechanisms for capturing and analysing trace data, increased amounts of tracing functionality are being placed on-chip. Examples of such on-chip tracing mechanisms are the Embedded Trace Macrocell provided by ARM Limited, Cambridge, England in association with their ARM7 and ARM9 processors.

A further problem associated with the tracing of data processing operations is that the increasing sophistication of data processing systems in the pursuit of speed and parallelism has led to a complication in the way in which operations are sequenced. In early data processing systems, the processor would execute each program instruction in turn and wait until that program instruction had completed before commencing the execution of the next program instruction. However, in order to increase the program instruction processing throughput, various techniques have been adopted whereby different instructions may be executed in parallel, in a pipeline fashion or in a manner whereby the completion of an instruction is not always required before the next instruction can be commenced. An example of this type of more sophisticated behaviour is the response of data processing system to load misses.

A load miss can occur when a data processing system seeks to load a data value (which may be data for processing or an instruction word) from a memory location. If that data value is present within a local cache memory, then the load instruction may be completed rapidly, possibly in a single clock cycle. However, should a load miss occur whereby the load of the data value cannot be satisfied from the cache and requires a slower non-cache access, such as to a main memory, then the data value will not be returned for possibly many processing cycles. Rather than halt data processing, it is known to provide systems, such as the ARM1020T processor, in which other program instructions can continue to execute whilst the data from the previous load miss is still awaited providing those later instructions do not require or depend on the data value that has not yet been retrieved.

In such a system supporting continued operation after data access misses, a problem arises in providing meaningful tracing in that the instruction stream being executed does not easily correlate with the data values being returned from memory accesses as observed on the memory busses.

SUMMARY OF THE INVENTION

Viewed from one aspect the present invention provides apparatus for processing data, said apparatus comprising:
(i) a processing circuit operable to process data values under control of processing instructions;
(ii) a memory operable to store data values to be processed, said processing circuit being responsive to a data access instruction to access a data value stored within said memory; and
(iii) a tracing circuit operable to generate a stream of trace data identifying processing instructions executed and data values accessed by said processing circuit; wherein
(iv) a data access instruction may result in a data miss such that a data value corresponding to said data access instruction is accessed upon a processing cycle subsequent to that upon which said access would occur without said data miss; and
(v) said tracing circuit is responsive to said data miss to generate a data place holder within said stream of trace data at a position where data identifying said data value would have been placed if said data miss had not occurred and then, when said access to said data value does occur, to insert at a later point in said stream of trace data a late data value identifying said data value.

The present invention recognises the above described problem with data access misses and late returned data values and provides the solution of inserting a data place holder within the stream of trace data identifying the point at which the data value would have been returned if the miss had not occurred and then later inserting a late data value resulting from the miss. The combination of the data place holder and the late data value enables subsequent analysis of the data stream to correctly identify which data values correspond to which access instructions and so obtain a proper understanding of the behaviour of the data processing system. It will be appreciated that the data values could be instruction words as well as data for manipulation and the term data values is intended to encompass both possibilities.

Whilst the present invention may be used in various different environments, it is particularly well suited to systems in which a cache memory and a main memory are provided as access misses within such systems are relatively common place and understanding the proper behaviour of the system in respect of access misses is important in debugging such systems properly.

The correlation between the data place holders and the late data could be achieved in various different ways. One preferred embodiment is to associate a tag value with each data place holder and then associate a corresponding tag value with each late data value (this mechanism is also able to cope with late data items being returned in a different order to their respective place holders). Thus, upon analysis of the stream of trace data the respective tag values can be matched to determine which late data value corresponds to which data place holder. Another preferred embodiment is one in which when each data place holder is inserted in the stream of traced data an indication is also given as to how many pending late data values are outstanding at that time such that when the stream of traced data is later analysed the appropriate late data value can be matched to the appropriate data place holder without requiring a complete stream of trace data. A further preferred embodiment is one in which the stream of traced data includes periodic synchronising data indicating how many outstanding late data values are awaited at that time. Thus, when the stream of traced data is picked up partway through, once a synchronising data portion had been read, then subsequent data place holders and data values can be matched together.

In the context of tracing operation of a data processing system, it is known to provide tracing watch points. Such tracing watch points may be used to trigger the control of tracing operation, such as tracing a single instruction, turning on the trace stream, turning off the trace stream or some other tracing action, based upon a predetermined set of criteria being met. One example of such a watch point criteria is that an access data value matches particular conditions. As an example, a tracing watch point could be set up to switch on the stream of tracing data whenever an access was made to a data value greater than a predetermined amount. In this context, it will be appreciated that access misses introduce significant complications. When an access miss occurs, it is not known until later whether the data value corresponding to that access miss will or will not match the triggering conditions. Whilst it is not possible to completely resolve this issue, preferred embodiments of the invention provide the ability either to select that the trigger condition is triggered when the access miss occurs on the assumption that the trigger will be matched when the late data value is returned, or to select that the trigger condition is not triggered until the late data value is actually returned and found to match. Providing both these options gives the trace system user the ability to configure the behaviour of the system to this circumstance as they wish. Examples of the circumstances where the two behaviours are required are:

(a) The trace stream is turned on based on the watch point, then left on. It is important that the trace stream is not turned on early, although it will be too late to trace the instruction that caused the original access.

(b) The trace stream is turned on only while the watch point criteria are met, then turned off again. A data value comparison is performed to reduce the amount of data stored in the trace stream, but if a load miss occurs the decision of whether to trace it must be made before the data is available, so it is assumed to match.

Effectively, the two circumstances are that either the data decides whether future events should be traced; or it is the data itself that is of interest.

Viewed from another aspect the present invention also provides a method of processing data, said method comprising the steps of:

(i) processing data values under control of processing instructions;

(ii) storing data values to be processed, a data access instruction being operable to access a stored data value; and (iii) generating a stream of trace data identifying processing instructions executed and data values accessed; wherein (iv) a data access instruction may result in a data miss such that a data value corresponding to said data access instruction is accessed upon a processing cycle subsequent to that upon which said access would occur without said data miss; and (v) said tracing circuit is responsive to said data miss to generate a data place holder within said stream of trace data at a position where data identifying said data value would have been placed if said data miss had not occurred and then, when said access to said data value does occur, to insert at a later point in said stream of trace data a late data value identifying said data value.

As well as providing an apparatus, such as a microprocessor bearing integrated circuit, and a method for generating trace data as described above, a complementary aspect of the invention is the provision of a system which is able to analyse a stream of trace data generated by such an apparatus and such a method. Such a computer program may execute upon a standard general purpose computer and may be provided in the form of a computer program product, such as a floppy disk or CD recording medium.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 3, 4 and 5 schematically illustrate three alternative systems for dealing with data access misses;

DESCRIPTION OF THE PREFERRED EMBODIMENTS

Figures 1, 2:
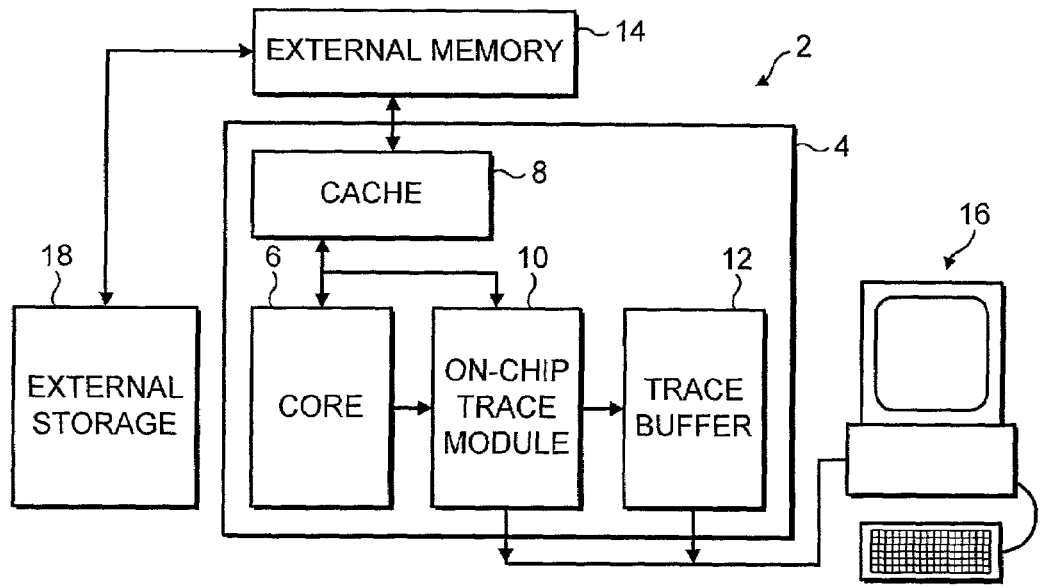
FIG. 1 schematically illustrates a data processing system providing on-chip tracing mechanisms.
FIG. 2 schematically illustrates the problem of data access misses when tracing data.

FIG. 1 schematically illustrates a data processing system 2 providing a on-chip tracing mechanism. An integrated circuit 4 includes a microprocessor core 6, a cache memory 8, an on-chip trace module controller 10 and an on-chip trace buffer 12. The integrated circuit 4 is connected to an external memory 14 which is accessed when a cache miss occurs within the cache memory 8. A general purpose computer 16 is coupled to the on-chip trace module controller 10 and the on-chip trace buffer 12 and serves to recover and analyse a stream of tracing data from these elements using software executing upon the general purpose computer 16.

It is often the case that the processor core 6 may, during operation, need to access more data processing instructions and data than there is actually space for in the external memory 14. For example, the external memory 14 may have a size of 1 MB, whereas the processor core 6 might typically be able to specify 32-bit addresses, thereby enabling 4 GB of instructions and data to be specified. Accordingly, all of the instructions and data required by the processor core 16 are stored within external storage 18, for example a hard disk, and then when the processor core 6 is to operate in a particular state of operation, the relevant instructions and data for that state of operation are loaded into the external memory 14.

FIG. 2 illustrates various behaviour in response to data access instructions that may occur within the system of FIG. 1. The processor core 6 in this case is an ARM processor executing ARM object code instructions. The first code sequence in FIG. 2 illustrates a load instruction 18 which loads data into a specified register from the memory location specified by an address given in another register $R_m$. In this case, the data access instruction results in a hit within the cache memory 8 and the corresponding data value from the address specified by the register $R_m$ is returned on the same cycle to the processor core 6.

In the second example, the same instruction sequence is issued, but in this case the instruction 20 results in a miss within the cache memory 8. The integrated circuit 4 is designed to cope with this behaviour and continues to execute the instructions following the load instruction 20 that gave rise to the miss providing those subsequent instructions do not require the missed data. At a variable time later, the data corresponding to the access miss is returned on the data bus of the system. The late data will be routed to the correct register and any register interlocking will be cleared. It will be appreciated that the delay until the late data is returned can vary depending on the particular circumstances. The integrated circuit 4 could be coupled to a multilevel external memory system, such as comprising a relatively fast off-chip cache memory in front of a larger but slower main RAM memory providing further storage. The mechanisms for enabling an integrated circuit itself to cope with such variable delay late data are known in the field, the technique of the present invention seeks to provide mechanisms which at least in their preferred embodiments also allow the tracing of data to also cope with such late returned data and variable delay data.

The third code sequence in FIG. 2 has two load instructions 22, 24 that both result in data misses and have corresponding late data returned. In this example, the late data returned on the data bus out of order from the sequence of the data access instructions 22, 24 that gave rise to it. Accordingly, the first missing data access 22 corresponds to the second late data item 26 whereas the second missing data access 24 corresponds to the first late data item 28.

FIG. 3 illustrates the behaviour of the on-chip trace module controller 10 in response to data access instructions that give rise to data misses. The on-chip trace module 10 writes its trace data at high speed into the on-chip trace buffer 12. This enables the tracing to occur in real time keeping pace with the full speed execution of instructions by the processor core 6. At a later time the general purpose computer 16 may read the contents of the trace buffer 12 to analyse the trace data.

As illustrated in FIG. 3, a first load instruction 30 results in a data miss within the cache memory 8. Accordingly, a data place holder 32 is inserted into the data trace stream at the corresponding point to the instruction 30 within the instruction trace stream that gave rise to the miss. This data place holder 32 has an associated tag value (Tag1) that identifies that data place holder. At a later time, a further data accessing instruction 34 results in a hit with the data value 36 being returned in the same processing cycle and placed within the data trace stream at a point directly matching the instruction 34. The next instruction 38 results in a further data miss and the insertion of a further data place holder 40 with a different identifying tag value (Tag2).

At a variable time later two late data values 42, 44 are returned on the data bus and inserted into the data trace stream. Each of these late data values has a tag value associated with it that enables it to be matched to a corresponding data place holder earlier within the data trace stream. In this particular example, the late data values are returned out of order with the data misses that gave rise to them. Accordingly, the first late data value 42 returned has a tag value of Tag2 and corresponds to the data place holder 40 and the instruction 38. The second late data value 44 has a tag value of Tag1 and corresponds to the data place holder 32 and the instruction 30.

It will be appreciated that the analysis of the data place holders and the late data values takes place outside of the integrated circuit 4 using the general purpose computer 16. The general purpose computer 16 can under program control search the data trace stream for data place holders with corresponding tag values and then replace these with later identified late data values with matching tags such that a proper correspondence can be drawn between instructions and the corresponding data returned. In the full trace analysis the late data value may be left in its position at which it was returned in order that the effects of the delay of the return may also be properly understood within the tracing environment with the tag matching being used to properly relate these late data values back to the matching instructions.

Having defined the behaviour of the instruction trace stream and the data trace stream, the control logic within the on-chip trace module controller that provides this functionality can be derived in accordance with standard techniques and standard integrated circuit design tools.

FIG. 4 illustrates a further embodiment. In this example, the data place holders do not include tag values, but instead indicate the number of pending late data values outstanding when they are themselves inserted into the data trace stream. Accordingly, the data miss resulting from instruction 46 results in a data place holder 48 indicating zero pending late data values. The next instruction 50 resulting in a miss occurs before the late data value corresponding to the data place holder 48 has been returned and accordingly the data place holder 52 indicates that there is already one pending late data value outstanding. The late data value 54 corresponding to the instruction 46 is then returned before a further instruction 56 resulting in a miss is executed. When the instruction 56 is executed, the number of outstanding late data values will still be one and accordingly the data place holder 58 is marked to indicate this.

Figure 5:
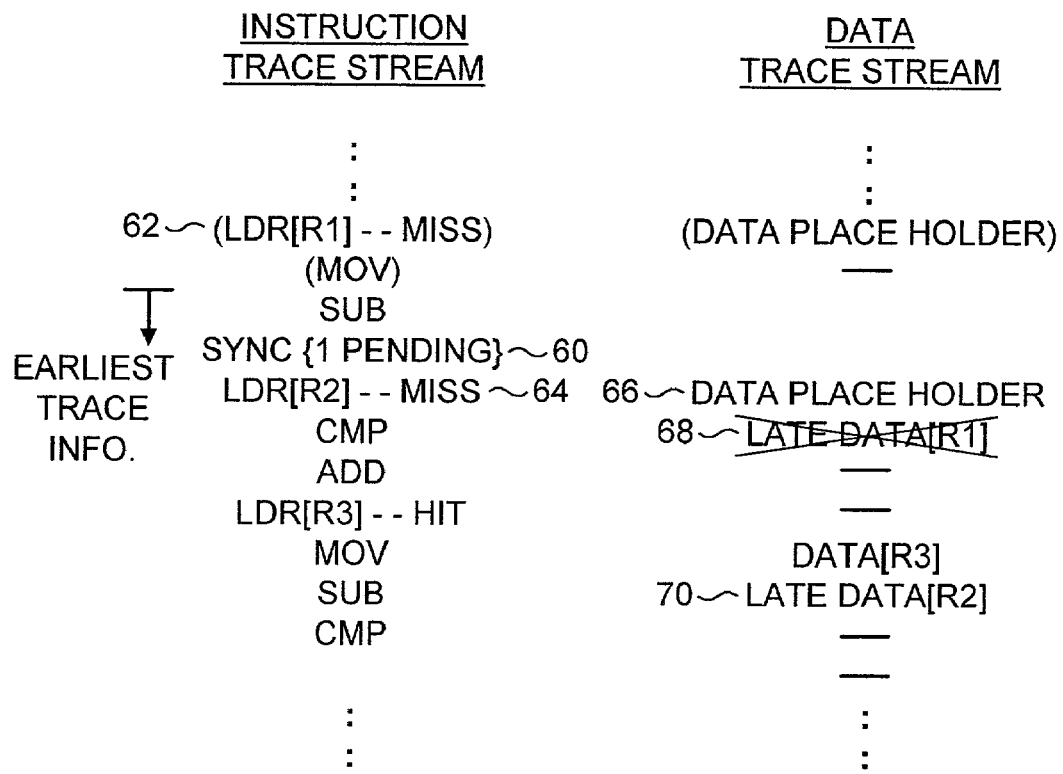

The data trace stream format shown in FIG. 4 allows the analysis of this trace stream to be picked up from a variable position and not be confused by late data values being returned for points prior to the start of the trace stream, but requires misses to be returned in order (as does the FIG. 5 embodiment).

FIG. 5 illustrates a further example trace stream format. In this example, synchronising data 60 is periodically inserted within the stream of traced data. This synchronising data indicates the number of outstanding late data items at that point of time. Accordingly, the synchronisation data item 60 indicates one pending late data item corresponding the missed data access instruction 62. The data place holders in this example do not include additional information specifying the instruction to which they correspond.

A load instruction 64 following the synchronising data item 60 also results in a miss with a corresponding data place holder 66 being inserted within the data trace stream. The first late data item returned 68 is ignored since the synchronising data element 60 tells us that it corresponds to an untraced earlier instruction 62 that resulted in a miss and accordingly cannot be properly analysed. When the next late data item 70 is returned, then this is determined to correspond to the load instruction 64.

Figure 6:
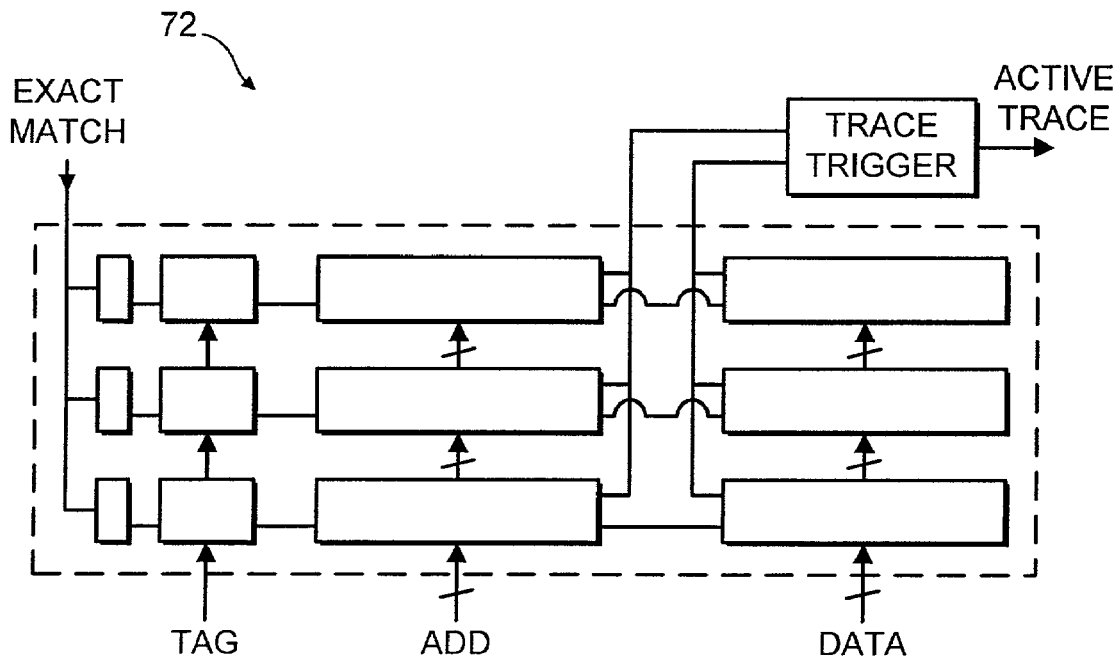
FIG. 6 illustrates a trace trigger mechanism.

FIG. 6 illustrates a circuit element 72 that may be used to trigger tracing control operations. This circuit element 72 comprises a plurality of comparitors which may be loaded with predetermined values, and possibly associated masks, for comparing current bus and address data values in order to trigger appropriate trace watch points.

In the context of late returned data, a data watch point will be configured to either be an exact match watch point or a non-exact match watch point. An exact match watch point will not be triggered until the late data is returned and found to match the criteria that have been specified. Conversely, a non-exact match watch point will be triggered when a data miss for that data value occurs upon the assumption that the late data when it is returned will result in a match. The configuration of the watch points to either of these two behaviours may be controlled by the user of the trace system as desired. A tag value corresponding to the late data values is also held within the watch point comparitor system in order to make the link between late data values returned and the corresponding addresses to which they relate.

Figures 7, 8:
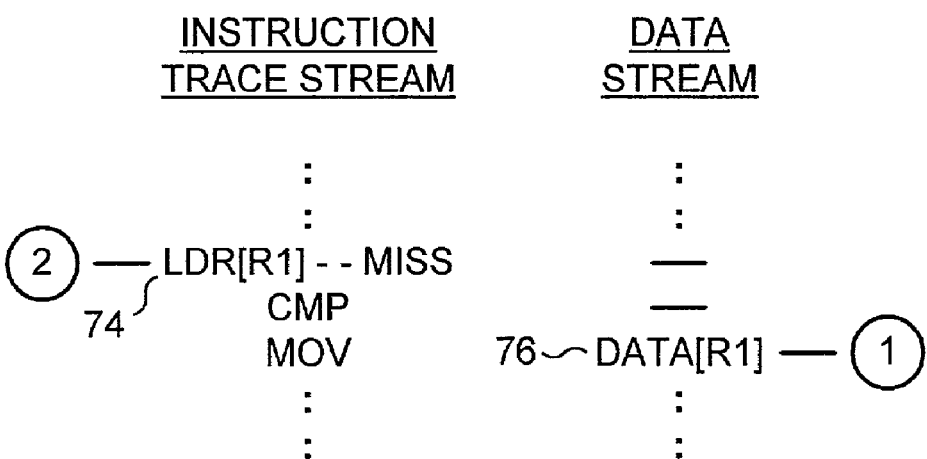
FIGS. 7 and 8 illustrate example behaviour of a trace trigger mechanism that may be configured to cope with data access misses.

FIGS. 7 and 8 schematically illustrate the different types of behaviour that may result from the system of FIG. 7. An instruction 74 results in a data miss. The data 76 is subsequently returned on the data but at a later time.

FIG. 8 assumes that a watch point has been set up to the address corresponding to that specified within the instruction 74 and accordingly an address match occurs for all of the possibilities indicated. In the first two possibilities, the watch point has set up to be an exact match watch point. Accordingly, in the first two examples the tracing event will not trigger until the data 76 has been returned and found to match. The first row of FIG. 8 indicates a data match and the tracing activation point will be point P1 in FIG. 7. In the third and fourth rows of FIG. 8, the watch point is set up as a non-exact watch point. Accordingly, in both of these cases the trace control will be triggered upon occurrence of the address match at point P2 irrespective of whether or not the data match subsequently occurs. It will be appreciated that in the fourth row the trace point has been triggered even though the data match did not subsequently occur.

The exact match signal can be controlled and used in various ways, e.g. making the exact match signal configurable depending on requirements (this may be preferred); choosing the exact match signal within hardware depending on the use the comparison is to be put; and making the comparison hardware capable of providing both behaviours simultaneously, using different behaviours in different parts of the tracing circuit as appropriate.

Figure 9:
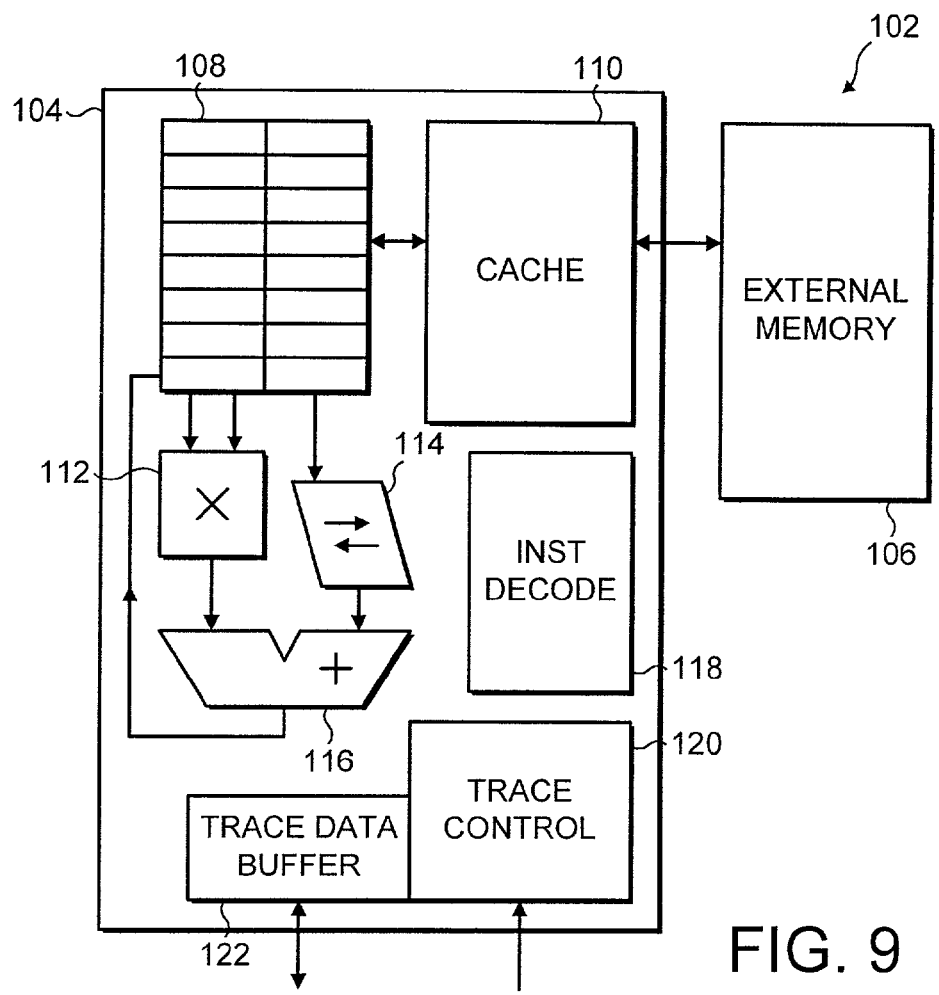
FIG. 9 schematically illustrates a data processing system supporting a tracing mechanism and multi-word data transfer instruction.

FIG. 9 illustrates a data processing system 102 including a microprocessor integrated circuit 104 and an external memory integrated circuit 106. The microprocessor integrated circuit 104 includes among its many different circuit elements (not all of which are shown) a register bank 108, a cache memory 110, a multiplier 112, a shifter 114, an adder 116, an instruction decoder 118, a trace controller 120 and a trace data buffer 122.

In operation, the instruction decoder 118 receives program instruction words and then generates control signals that are used by the other elements within the microprocessor integrated circuit 104 to control the operation of those elements. A particular instruction may involve the performing of an arithmetical logical operation upon values held within the registers of the register bank 108 using one or more of the multiplier 112, the shifter 114 and the adder 116. Another type of data processing instruction to which the instruction decoder is responsive is a multi-word data transfer instruction. An example of such a type of instruction is the LSM instruction provided by microprocessors such as the ARM7 and ARM9. Details of the operation of these example multi-word data transfer instructions may be found in the Data Sheets for the above microprocessors.

The trace controller 120 and the trace data buffer 122 are provided on-chip to the microprocessor integrated circuit 104. The trace controller 120 provides many different types of operation included within which is the initiation of tracing operations when trace triggering conditions are detected. The trace controller may "snoop" the address and data buses within the system to detect particular address values and data values or may be responsive to signals controlling the register bank 108 to detect accesses to a particular register within the register bank 108. In any of these cases, the trace controller 120 may serve to initiate tracing operation when a predetermined condition is detected and cause a trace data stream to be stored within the trace data buffer 122. This stream of trace data may subsequently be downloaded from the trace data buffer to an external trace data buffer analysing system where it may be examined and interpreted by a person wishing to debug the system or understand its separation more completely.

Figure 10:
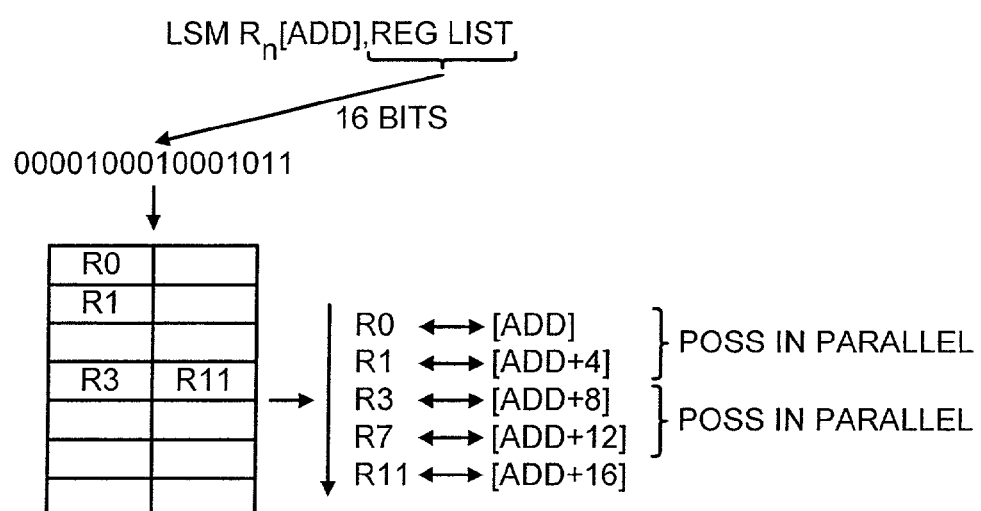
FIG. 10 schematically illustrates a multi-word data transfer instruction.

FIG. 10 illustrates a multi-word data transfer instruction, an LSM instruction as mentioned above. Within the fields that control the operation of this instruction is a pointer to a register $R_n$ within the register bank 108 that controls a memory address storing data values which will provide the starting point for the multi-word transfer of the instruction. The instruction also includes a 16-bit field with one bit corresponding to each of the sixteen registers within the register bank 108. A value of "1" at a particular bit position indicates that a data transfer is to take place for that register and accordingly any number of data transfers between one and sixteen can be specified by a single LSM instruction. In the example illustrated, the register list specifies that five data words are to be transferred between the memory addresses starting at the value held within the register $R_n$ and the registers R0, R1, R3, R7 and R11. The transfers start with the lowest numbered register and progress with a memory increment of four bytes for each transfer.

As illustrated in FIG. 10 high performance embodiments of the data processing system 102 may serve to transfer two data values in parallel from the memory systems (either the cache memory 110 or the external memory 106) to their respective registers. This will allow an LSM instruction to complete more rapidly and speed overall processing. Within such embodiments care must be taken such that the programmer's model whereby the data transfers occur sequentially is not violated should an interrupt or exception occur partway through execution of the LSM instruction.

Figure 11:
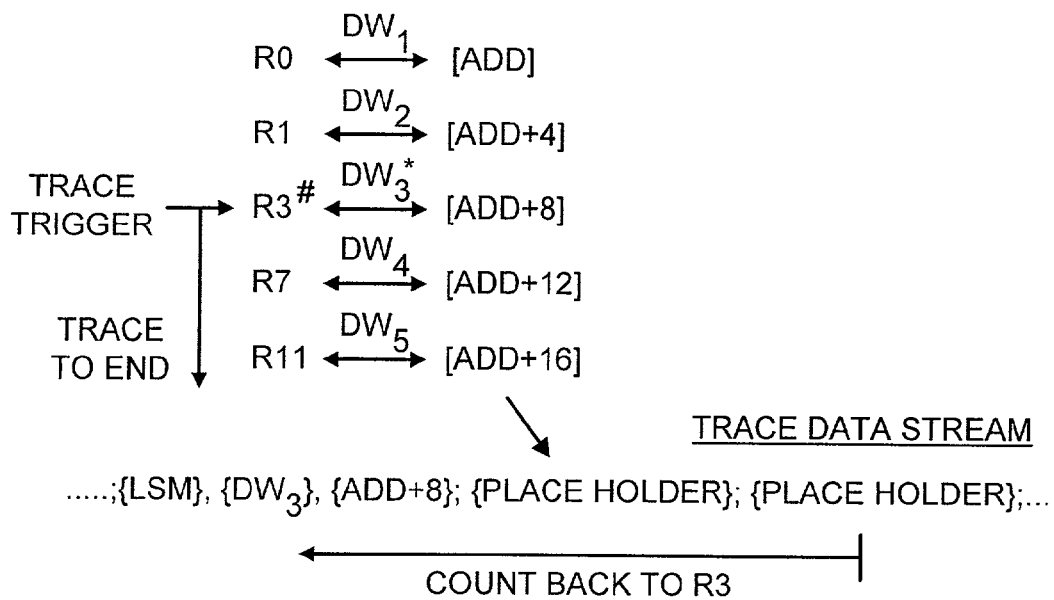
FIG. 11 schematically illustrates a trace trigger point occurring partway through a multi-word data transfer instruction and the resulting trace data stream.

FIG. 11 develops the example of FIG. 10 and uses this to illustrate the triggering of a predetermined trace initiating condition partway through the multi-word data transfer instruction LSM. In particular, the third data transfer of the data word $DW_3$ between the register R3 and the memory location Add+8 gives rise to a trigger. The trigger could be from the particular register being accessed as indicated by the "#", from the data value being transferred as indicated by the "*", or from the memory location being accessed as indicated by the "!". It is also possible that multiple of these conditions could be simultaneously met resulting in the trace triggering occurring at that point within the multi-cycle multi-word data transfer instruction.

The trace controller 120 detects the trace trigger condition and initiates tracing operation by writing a trace data stream of trace data to the trace data buffer 122 starting from the transfer that triggered the trace. In particular, the multi-word data transfer instruction itself is written into the trace data stream followed by the data value and the address value that gave rise to the trace trigger. The remaining data transfers up to the end of the multi-word data transfer instruction (which may be a write or a read) result in trace data being added to the trace data stream. In order to preserve trace data stream bandwidth place holder data codes may be inserted for each of these transfers up to the end of the LSM instruction rather than including more detailed information. The place holder codes may be used by a later analysing system to count back to the register which initiated the trigger and thereby identify the register concerned. It will be appreciated that the trace controller 120 may be arranged to only trace the triggering transfer itself and its subsequent transfers within the same instruction with no subsequent tracing of later instructions or alternatively may be arranged to turn on tracing that remains turned on from that point forward. Both of these and other possibilities will be apparent to those in the field.

Figure 12:
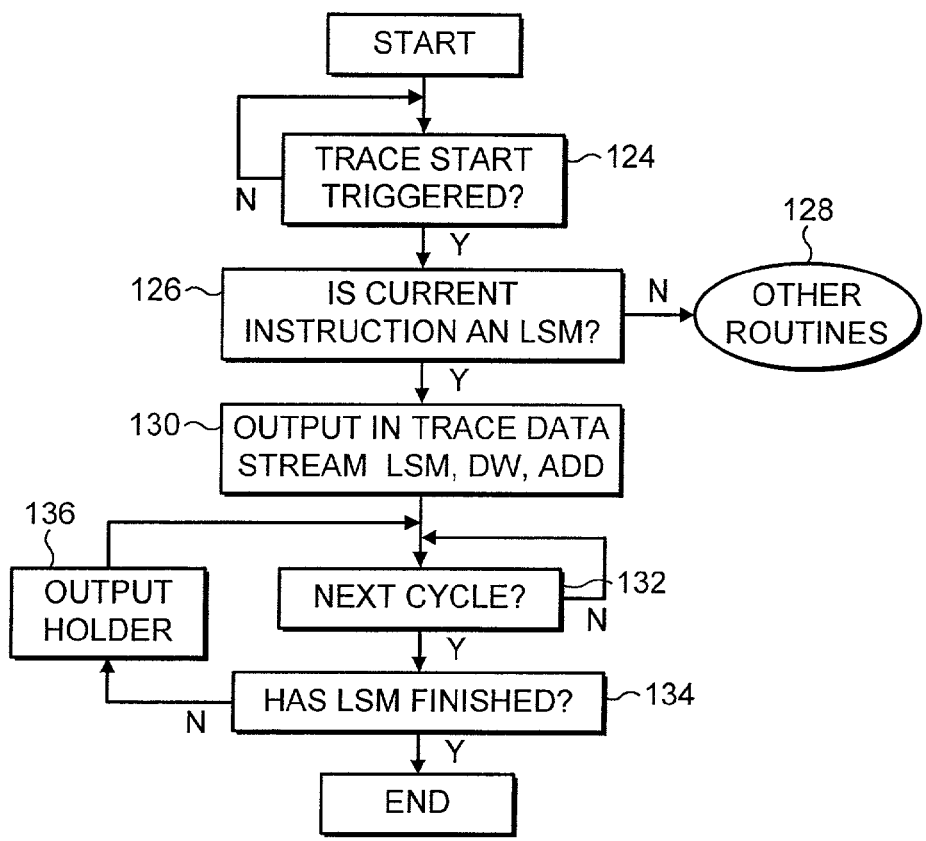
FIG. 12 is a flow diagram illustrating the flow of control within the on-chip tracing hardware.

FIG. 12 schematically illustrates the control operation that may be performed by the trace controller 120. At step 124 the trace controller 120 continuously checks to determine whether it has been triggered to start tracing. At step 126 a check is made as to whether or not the trace has been triggered during execution of a multi-word data transfer instruction LSM. If the trace trigger is not the result of a multi-word data transfer instruction, then processing proceeds to other routines 128 that will not be described further in the context of this technique.

Assuming that the trace was triggered by an LSM instruction, then step 130 is executed at which the instruction, data word and memory address are written into the trace data stream for the triggering operation. As each subsequent operation is detected by step 132 a check is made at step 134 as to whether or not this is still part of the same LSM instruction. If the same LSM instruction is continuing, then processing proceeds to step 136 at which a place holder code is inserted into the trace data stream to indicate a further data transfer and processing is returned to step 132. If the test at step 134 indicates the multi-word data transfer instruction has finished, then the tracing of that instruction finishes. In some embodiments tracing may remain switched on and subsequent instructions be traced into the traced data stream or alternatively tracing may cease if only the particular triggering instruction was set up to be traced.

Figure 13:
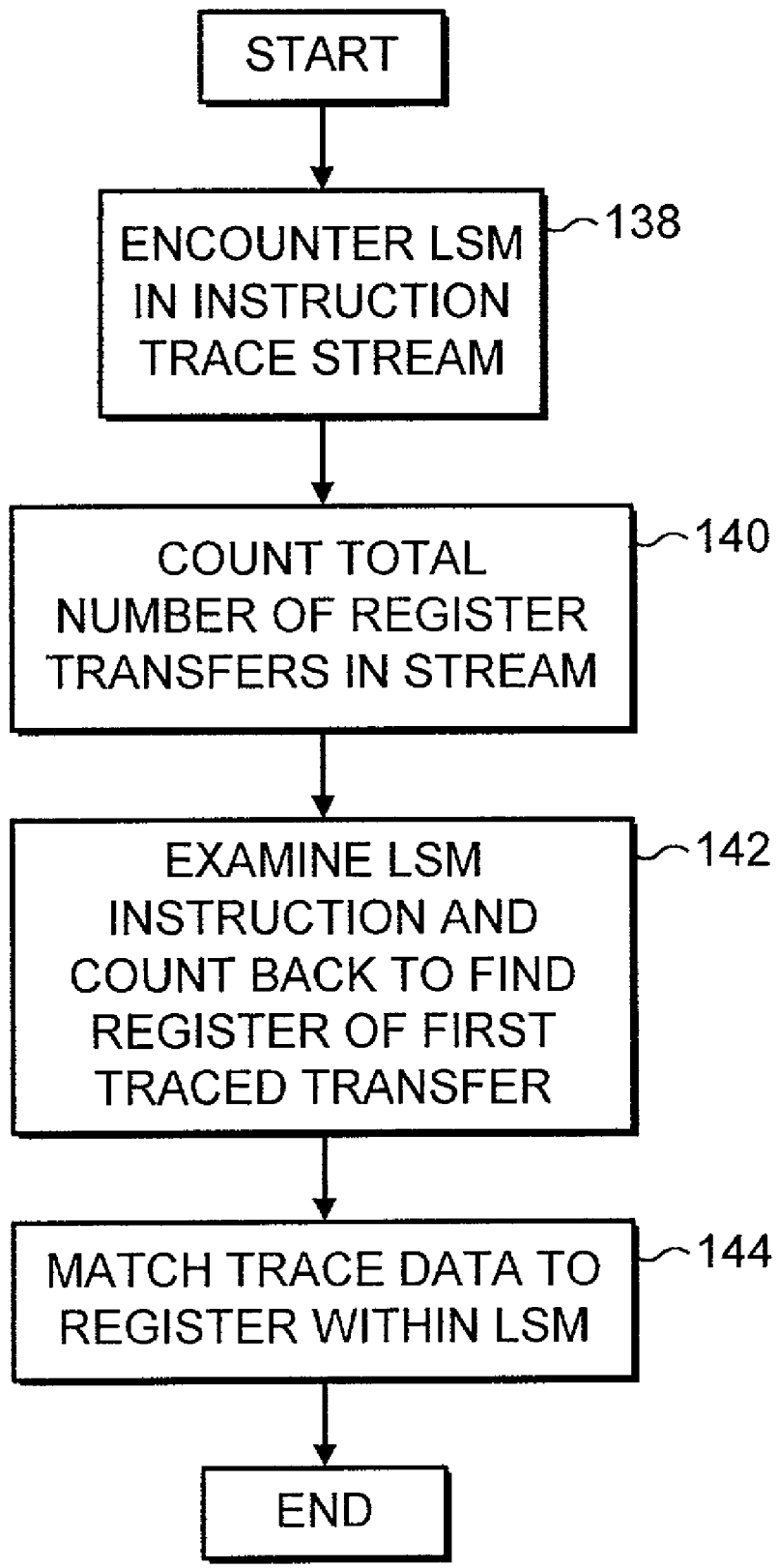
FIG. 13 schematically illustrates the processing operations that may be performed in the system for analysing the trace data generated in accordance with the system of FIGS. 9 to 12.

FIG. 13 schematically illustrates the processing that may be performed within a trace data analysing system responsive to the trace data stream produced in accordance with the embodiment described above. At step 138 an LSM multi-word data transfer instruction is encountered within the trace data stream (or at least the instruction portion of the trace data stream). At step 140 the analysing system counts through to the end of the transfers marked within the trace data stream for that LSM instruction until the final data transfer and total count of the data transfers is established within the trace data stream.

A further description of the tracing techniques of at least preferred embodiments of the invention are given in the following architectural description, which should be read in conjunction with the Embedded Trace Macrocell (Rev1) description publicly available from ARM Limited, Cambridge, England:

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The following terms and abbreviations are used below.

| Term | Meaning |
| --- | --- |
| Current protocol | ETM protocol used for ETM7 and ETM9 |
| New protocol | Protocol for ETM10 |
| ETM packet | Several bytes of related data placed into the ETM FIFO in a single cycle. Up to 3 packets can be placed into the ETM10 FIFO in one cycle |
| Packet header | The first byte of an ETM packet that specifies the packet type and how to interpret the following bytes in the packet |
| CONTEXT ID | A 32bit value accessed through CP15 register 13 that is used to identify and differentiate between different code streams. This value was previously referred to as the Process ID in ETM7 and ETM9 documentation. The name has changed to avoid confusion with the 7bit FCSE PID register, which is also located in CP15 register 13 and has also been referred to as Process ID. |
| Trace Capture Device | Any device capable of capturing the trace produced by the ETM: a TPA, a logic analyser, or an on-chip trace buffer. |
| LSM | Load or Store Multiple Instruction: LDM, STM, LDC or STC instruction |
| Exceptions | Instructions that interrupted by an IRQ, FIQ, PABORT, or reset assertion |

SCOPE

This document is intended to specify the functionality of the ETM10. ETM10 is a real time trace module capable of instruction and data tracing. Functionality is similar to that of previous ETM implementations for the ARM7 and the ARM9. It is assumed that the reader is familiar with the original ETM specification which is outlined in the Embedded Trace Macrocell Specification (ARM IHI 0014D). This specification is not intended to restate the common architectural features between ETM10 and previous ETM versions, but rather to discuss the portions of the ETM specification that change for ETM10. Most of these changes involve the creation of a new ETM protocol that is capable of properly tracing ARM1020E. This protocol is intended to be extensible for tracing future ARM cores as well.

INTRODUCTION

The Embedded Trace Macrocell is an integral part of ARM's Real Time Debug solution which includes the ETM, a trace port analyser, and a software debugger (such as ADW).

An Embedded Trace Macrocell consists of two parts, a trace block and a trigger block. The trace block is responsible for creating the compressed trace and outputting it across the narrow trace port. The trigger block contains programmable resources that allow the user to specify a trigger condition. The trigger block resources are also used as a filter to control which instructions and which data transfers are traced. All ETM configuration registers (including the trigger block resources) are programmed through the JTAG interface. The user accesses these registers using a software debugger. Once the trace has been captured, the debugger is also responsible for decompressing the trace and providing with user with a full disassembly of the code that was executed. Since the debugger software would not be capable of processing the ETM trace port output in real time, the trace is initially captured into an external Trace Port Analyser (TPA). The TPA may be a fully functional logic analyser, or an ETM specific device such as the Agilent nTrace box. The debugger extracts the trace information from the TPA once the trigger condition has occurred and the debug run has completed. At this high level of description, ETM10 is functionally identical to ETM7 and ETM9.

Changes Required for ETM 10

From a user's view, ETM10 will provide equivalent instruction and data tracing capability to that provided by ETM7 and ETM9 with just a few minor differences. This section describes the changes that are being made to the ETM architecture for ETM10 and why they are being made. Many changes affect only the decompression software and are invisible to the rest of the trace toolkit software as well as the end user. However, some changes do affect the programmer's model or result in minor differences in tracing behaviour from ETM7 and ETM9. Such changes are noted in this section. Any changes for ETM10 that require in-depth explanations of the new protocol are covered more thoroughly in the protocol description given in section 5.

1.2 Branch Phantom Tracing

ARM10 implements "branch folding" which means a branch can be predicted, pulled out of the normal instruction stream, and effectively executed in parallel with the next instruction in the program. These folded branches are referred to as branch phantoms. The PIPESTAT encodings in the old protocol only account for one instruction executed per cycle. To allow branch phantoms to be traced, new encodings will be added to the PIPESTAT field that represent a folded branch in parallel with an instruction. The new PIPESTAT values are given in the ETM10 protocol specification in section 5.

Folded branches require changes to the trigger block as well. When a branch is folded, effectively two instructions are executed in parallel. Since the PC value for these two instructions is not guaranteed to have any identifiable relationship, two address comparisons must be made each cycle. This implies that each address register will require two comparators. Both comparator outputs will be taken into consideration when determining whether or not tracing is enabled. (If either of these two instructions should be traced, then tracing will be enabled that cycle.) Special care has been taken to insure that, at most, one extra instruction is traced due to branch folding. In general, the user does not need to be aware when a branch has been folded and executed in parallel with the next instruction to properly program TraceEnable or ViewData.

For events, parallel execution of instructions makes it possible to have slightly different behaviour from ETM10 versus ETM7/9. It is not felt that there is much loss of functionality here due to the way events are typically used. Counters can only count down once per cycle, but counting has only ever provided an accurate count of accesses when single address comparators are used. Furthermore, there is no loss of functionality to the Trigger, TraceEnable, ViewData or ExtOut events: here the event will be active if either instruction or data transfer would have individually caused it to be active, which is the desired behaviour. If the sequencer receives multiple transition requests in the same cycle, no transitions will take place and the sequencer remains in the original state. This behaviour is identical to that of ETM7 and ETM9. However, ETM10 may have more occurrences of multiple transition requests in a cycle since ARM10 supports more parallel execution. The user will need to be aware of this behaviour when programming the sequencer, but there is a workaround for simple events. If the desired behaviour is to transition from state 1->2 based on event A and from state 2->3 based on event B, program 1->2 to occur on event (A & !B), 2->3 on event B, and 1->3 on event (A & B). Programming the sequencer in this way insures the proper handling of simultaneous occurrence of event A and event B.

1.3 Load Miss and Exception Tracing

ARM10 has a non-blocking data cache that allows other instructions, including other memory instructions, to execute underneath a single outstanding miss; thereby allowing the data cache to return data to the core out-of-order. This feature is an issue for tracking load data since the current protocol expects load data to be placed in the FIFO in-order. Data packets are now prefixed by a header byte in part to accommodate out-of-order load miss data. Header bytes are described in detail in section 5.

Supporting a non-blocking cache also requires changes to data comparators. Like ETM7 and ETM9, ETM10 has data comparators which are used in conjunction with a pair of address comparators. When used, the comparator will only trigger a match when the data matches as well. Since other memory accesses can occur underneath a miss, a bit is added to each comparator to remember whether or not the address for a load request that resulted in a miss matched. When the load miss data is returned, the data value comparison is done, and the saved address match bit is used to qualify the results of the comparison. This match bit is then cleared. In some cases, the user may not wish to wait for miss data to be returned to enable the comparator. Instead, they may want load misses to always be traced based on the data address only. To support both usage models, a bit has been added to the address access type register to allow the user to specify which mode is enabled for each comparator. The user should set bit 8, the Exact Match bit, of the address access type register if waiting for load miss data on a comparison is desired. (Refer to reference 1 for more information on the access type registers.) Waiting for the data compare to occur is useful when data values are used to create triggers and other events. Tracing load misses based on the address alone is useful when the comparator is used for trace filtering and some extraneous tracing is not considered to be a problem. The user should be aware that using data values to create an event, such as a sequencer transition, could result in out-of-order events occurring since the load data may be returned out-of-order. If the user has concerns that ARM10's non-blocking cache may affect programmed events, this feature may be disabled in the core through writes to the cp15 configuration register (r1). Refer to the ARM1020E TRM (reference 3) for more information.

Bit 7 of the access type register is also used to specify comparator behaviour when an abort, interrupt, or soft reset occurs. These conditions are generically referred to as exceptions. If a data access is aborted and bit 7 is asserted, the comparator will NOT result in a match output, regardless of whether or not a data match is requested. If the comparator is tied to an instruction address, then the exact match bit is used to prevent matches on instructions, which are marked as exceptions. This behaviour is often desired when a comparator is meant to fire just once since instructions and data requests that result in exceptions are usually reattempted once the aborting or interrupting condition has been resolved. In the data access case, when bit 7 is not asserted, an aborted access will result in a match based purely on the address since the data value is assumed to be invalid.

The same Exact Match bit is used for determining proper handling of load misses and data aborts since the desired behaviour would typically be the same for both cases. The default value for the Exact Match bit is zero.

1.4 ARM10 Data Tracing

ARM1020E has a 64 bit data bus capable of returning 64 bits of data in a single cycle. To support this 64 bit data bus, ETM10 must be capable of tracing two adjacent data values in a single cycle. To support tracing just one value or the other, two ViewData outputs are now generated. However, there is still just one output for events and one output for TraceEnable. Having one event output can affect the counter and sequencer logic since two adjacent 32 bit requests that are accessed in the same cycle will only result in one decrement of the counter or only one state change by the sequencer. This should be taken into account by the user when programming event logic, but it is not expected to be a significant problem.

1.5 LSM Tracing

The ARM1020E has an independent load/store unit, which allows other instructions to execute underneath a load or store multiple instruction, hereafter referred to as an LSM, while the load/store unit iterates through the data accesses. (i.e. executing an LSM does not stall the core). To support this, some changes are required to the address comparator output and to the assertion of TraceEnable:

- Whenever tracing it active while iterating on an LSM instruction, it will remain active until the LSM completes, regardless of whether or not TraceEnable remains asserted. (The only exception to this rule would be the overflow case.) This rule has the side effect of causing other instructions executed underneath the LSM to be traced regardless of whether or not they otherwise would have been. However, it will not result in any extra data packets since instructions running underneath the LSM by definition cannot be data instructions.
- Whenever a comparator is activated on the instruction address of an LSM, the ViewData output of that comparator will remain asserted until the entire instruction completes. This is done since the intention of the user is to trace all data packets associated with this instruction. In a similar fashion, ViewData and Event range outputs will remain asserted until the completion of the LSM instruction. Event single address comparator outputs do not remain asserted since by definition these outputs should assert for just a single cycle.
- Once a data transfer associated with an LSM has been traced, subsequent transfers associated with that instruction that would not normally be traced will have a placeholder packet output (Value Not Traced—see section 5.) These placeholder packets are required to determine which words were traced.

The ETM protocol allows for instruction tracing to be enabled based on load/store data addresses (and data values). Since on ARM10, the LSM instruction may no longer be in the core's execute stage when the tracing enabling event occurs, this instruction address will need to be kept around and broadcast in a special way to support this feature. This is accomplished using the LSM in Progress TFO packet. Trace Packet Offsets are described in section 5.2.4.

1.6 Auxiliary Data Tracing

The addition of data headers to the protocol also allows for the tracing of auxiliary data types (i.e. the tracing of data values other than those for load, store, and CPRT instructions). This auxiliary data type tracing is meant to allow for expansion of ETM tracing, which may include the tracing of external ASIC data in future versions of the ETM. More information is given on auxiliary data tracing in the data headers discussion in section 5.

1.7 CONTEXT ID Tracing

CONTEXT ID values need to be broadcast whenever they are updated and whenever a TFO packet is required for synchronisation. For ETM10, CONTEXT ID values are output when they are updated by simply enabling data tracing for the CPRT instruction that resulted in a CONTEXT ID change. A unique data header for this data packet allows the decompressor to recognise that the data is a new CONTEXT ID value (data headers are discussed in section 5). The ETM also broadcasts the current Context ID value whenever trace is enabled, and during trace synchronisation cycles which are described in section 5.2.4. The CONTEXT ID update instruction is MCR c15, 0, rd, c13, c0, 1.

Rather than requiring another 32 bit port on the ARM10<->ETM10 interface, ETM10 recognizes Context ID updates and maintains the current Context ID value in an internal shadow register. To properly maintain coherency, this register will always be updated, even when the ETM is in POWERDOWN mode. (ETM register 0x4, bit 0 is asserted).

Using CONTEXT ID values for trace filtering is being added as an additional feature for ETM10. This will be implemented via a new set of programmable registers in the ETM in which an expected CONTEXT ID value can be specified:

| Register encoding | Description |
|---|---|
| 110 1100 | CONTEXT ID value 1 |
| 110 1101 | CONTEXT ID value 2 |
| 110 1110 | CONTEXT ID value 3 |
| 110 1111 | CONTEXT ID mask value |

The same mask is used for each CONTEXT ID comparator, and works in the same way as data comparator masks.

Bits 9:8 of the address comparator access type registers will indicate whether CONTEXT ID comparators are used. A value of 00 causes the CONTEXT ID comparators to be ignored. A value of 01, 10 or 11 causes the address comparator to match only if the current CONTEXT ID matches that in CONTEXT ID comparator 1, 2 or 3 respectively, after taking account of the CONTEXT ID mask.

New event resources will be allocated to allow the CONTEXT ID comparators to be accessed directly from within the event block (see section 3.3.4 of ARM IHI 0014D). These new resources will be mapped to 0x58–0x5A:

| Bit encoding | Range | Description |
|---|---|---|
| 101 | 0x8 to 0xA | CONTEXT ID comparator matches |

A new field will be added to the ETM configuration code register to indicate the number of CONTEXT ID comparators present (see section 4.2.2 of ARM IHI 0014D):

| Bit numbers | Valid Range | Description |
|---|---|---|
| 25:24 | 0 to 3 | Number of CONTEXT ID comparators |

1.8 Trace Output Frequency

The ARM1020E Macrocell will be capable running at core frequencies beyond 300 MHz. Previous ETM implementations have not pushed frequencies beyond 200 MHz. The maximum output frequency attainable for an ETM trace output is dependent upon the maximum sample frequency of the trace analyser and the maximum output frequency attainable at the pads. Agilent and Tektronix analysers can capture at a maximum frequency of 333 MHz and 400 MHz, respectively. However, it is highly unlikely that any CMOS pads available from ARM partners will be capable of providing clean, traceable signals at this frequency. Therefore, the pads are expected to be the speed-limiting factor. Some speed improvements can be obtained by using larger pads and/or using board level buffering. These techniques may allow us to trace reliably at 200 MHz. For tracing at higher speeds, there are two options. We can double the pin count and halve the frequency (a demultiplexed trace port), or we can utilise an on-chip trace buffer. Both techniques have positive and negative points.

Doubling the pin count is not an attractive option to some partners due to package limitations and the high cost of additional pins. This technique will also require changes to the TPA, and, most likely, the addition of a second mictor connector which takes up more board area and adds more cost. Furthermore, this technique still has a speed limitation of 400 MHz. An ARM10 processor fabricated in a hot process will most likely exceed these speeds.

The on-chip buffer has the advantages of tracing reliably at the core clock speed and of not requiring any extra pins. In fact, if all trace capturing will be done utilising the on-chip buffer, then the externally visible ETM port can be eliminated since the on-chip buffer would be downloaded via Multi-ICE through the JTAG port. The disadvantage of this solution is that the size of the on-chip buffer is typically quite small, on the order of 8–16 KB. Therefore, tracing depth is limited. Larger on-chip trace buffers are possible, but directly impact the size of the ASIC, and even a small trace buffer may use more silicon space than can be afforded in some designs.

Due to the varying advantages and disadvantages of each method, both of the options listed above are planned to be supported. The ARM10200 rev 1 test chip will be built with a demultiplexed trace port for high-speed tracing. An on-chip trace buffer will not be part of the ARM10200 rev 1 test chip.

A specification for an on-chip trace buffer for ETM9 has been written, and an implementation is in progress. It would be possible to create an ETM10 compatible on-chip trace buffer from this design with just a minor change to support the new 4 bit PIPESTAT encodings that are described in detail in section 5.2. Refer to reference 4 for more information on what Trace Capture Device changes are required to support ETM10. Depending on timescales, an ETM10 compatible on-chip trace buffer may offer additional features, such as dynamic trace compression, and it may in fact be integrated directly into ETM10 design as a FIFO replacement.

1.9 Synchronization Register

In previous ETM implementations, synchronisation occurred via a five-byte instruction address every 1024 cycles, and a five-byte data address every 1024 cycles. For ETM10, these synchronisation points will be configurable via a new 12 bit programmable register. Configurable synchronisation makes it easier to utilise a full range of trace buffer sizes. Small trace buffers, such as the on-chip trace buffer, can synchronise frequently to avoid throwing away large portions of the trace, while larger trace buffers can synchronise infrequently to avoid wasting trace throughput on unneeded synchronisation. The default counter value will be 1024 cycles. To prevent data address and instruction address synchronisation from occurring concurrently, data address synchronisation will occur when the counter reaches its midpoint value and instruction address synchronisation will occur when the counter reaches zero. The address for the new synchronisation register is 0x78.

1.10 Memory Map Decoder

The external memory map resource inputs that were present in previous ETM implementations are not being supported for ETM10. The extra complexities present in the ARM10 architecture make support for an external decoder more difficult to implement. External events can still control tracing by utilising the EXTIN inputs, which are now cycle accurate (discussed in section 4.15).

1.11 RANGEOUT

Previous ETM implementations have been able to use data value compare registers inside the Embedded ICE logic as extra trigger resources. This functionality was accomplished by using the RANGEOUT outputs coming from the Embedded-ICE. The ARM10 debug unit does not have these RANGEOUT outputs since it does not have any data value compare functionality. Therefore, this resource reuse is not possible for ETM10. This has a minor impact on the programmer's model since these resources can no longer be programmed.

1.12 Branches to Interrupt Vectors

The current protocol specifies that direct branches to entries in the interrupt vector table must be traced as indirect branches. This is no longer always possible as phantom branches cannot be converted into indirect branches within the proposed protocol. Therefore for consistency and simplicity direct branches to interrupt vectors will no longer be traced as indirect branches, regardless of whether or not the direct branch was a branch phantom. It is possible to detect branches to the PABORT, FIQ, IRQ, DABORT, and RESET vectors due to a special encoding in address byte 5 that is described in 5.3.1

1.13 Protocol Version

The 4-bit ETM protocol version field present in the configuration code register (register 0x01) on ETM7 and ETM9 has been determined to be insufficient to support future protocol versions for the ETM. Therefore, a new ETM ID register has been defined that contains fields specifying the ARM core for which it is intended as well as minor and major protocol revision numbers. This register is mapped to register address 0x79 and is considered valid whenever bit 31 in the configuration register is set. This allows ETM7 and ETM9 to still use protocol variants 0–7 without requiring the ID register. The ETM ID register will contain a 32 bit value broken up into the following fields:

| Bit numbers | Description | Examples |
|---|---|---|
| [3:0] | Minor protocol number | ETM 7/9 rev 0 = 0 |
| | | ETM 9 rev 0a = 1 |
| | | ETM 7/9 rev 1 = 2 |
| [7:4] | Reserved | N/A |
| [11:8] | Major protocol number | ETM 7/9 = 0 ETM 10 = 1 |
| [15:12] | ARM Core | ARM 7 = 0 |
| | | ARM 9 = 1 ARM 10 = 2 |
| [16] | Indicates that 32 bit data value comparisons require 2 register updates | ARM 10 = 1 |
| [23:17] | Reserved | ARM 10 = 0x00 |
| [31:24] | ASCII character 'A' | ARM 10 = 0x41 |

ETM10 rev0 will have the ID value 0x41012100.

1.14 Trace Start/Stop Resource

A new event resource will be included to give the current state of the TraceEnable start/stop logic. This shall be given resource number 101 1111 (see section 3.3.4 of ARM IHI 0014D), and shall be asserted whenever the Trace Start/Stop block is active. ETM versions that support the start/stop resource will also assert bit 23 in the ETM control register.

1.15 TPA Changes

All TPAs will need a minor change to support the new trigger and trace disable status values for ARM10. Namely, they must ensure that PIPESTAT[3]/TRACESYNC is LOW in order to detect TR and TD PIPESTATs. For logic analysers this is simply a minor software change. The Agilent nTrace will require minor hardware changes as well. To support high speed tracing through a demultiplexed, half speed ETM port, the TPA will need to be capable of capturing two core cycles worth of trace data in each cycle. This data will be broadcast across two Mictor connectors. Therefore, support for multiple connectors is required as well. For more information on these changes, please refer to reference 4.

1.16 Precise Events

In ETM7 and ETM9, events generated via the Event block were imprecise, which means the user was not guaranteed to trace the data access or the instruction that generated the Event. For ETM10 this is no longer the case. Assertion of ViewData and TraceEnable is always precise regardless of how it is generated.

1.17 FIFOFULL Level Register

For ETM7 and ETM9 register 0x0B was used to set the level at which the FIFO must reach before FIFOFULL would be asserted. For ETM10, FIFOFULL this register is not used and instead FIFOFULL, when enabled, is asserted whenever new packets are to be placed in the FIFOFULL. ETM10 is more deeply pipelined than ETM7/9, and FIFOFULL can only be asserted early enough to be useful if it is used in this way. In ETM10, the FIFOFULL register is reused as a read-only register that specifies the FIFO size. FIFO size is something that could not be determined by software in ETM7/9.

1.18 TRIGGER Output

If the processor is in monitor debug mode, DBGRQ will be ignored. Therefore, it is useful to have some other mechanism to allow the core to recognize that a trigger has occurred. For this purpose, a single bit TRIGGER output has been added to the ETM interface for ETM10. The TRIGGER output is asserted whenever the four-bit TRIGGER status is driven on the PIPESTAT bus. This signal can then be used by an interrupt controller to notify the core of the trigger via the assertion of an interrupt. The TRIGGER output can be left unattached if it is not needed.

1.19 Counter Event

For ETM7/9, the counter event registers had an extra bit 17 which could be used to count continuously. This bit has been removed since its behaviour is redundant and hard to verify. If the user wants a continuous counter, simply program the event equal to external resource 15, which is hardwire to be always active.

ETM10 Trace Port 1.20 ETM10 Port Signals

The ETM10 trace port consists of two signals, PIPESTAT and TRACEPKT, which are both valid on the rising edge of TRACECLK (which has the same frequency as GCLK.) PIPESTAT has been expanded for ETM10 from a 3 bit to a 4-bit signal to add encoding space for branch phantoms. TRACEPKT has not changed from the previous ETM versions; it can be 4, 8, or 16 bits depending on the configuration. The TRACESYNC pin has been removed from the protocol since synchronization is now achieved via another mechanism. The overall result is a trace port with the same pin count as previous ETM implementations.

| Encoding | Mnemonic | Description |
|---|---|---|
| 0000 | IE | Instruction executed |
| 0001 | DE | Instruction executed, packet(s) have been placed on the FIFO |
| 0010 | IN | Instruction not executed |
| 0011 | DN | Instruction not executed, packet(s) have been placed on the FIFO |
| 0100 | WT | Wait: No instruction this cycle, valid data is on the trace port |
| 0101 | DW | Wait + data: No instruction this cycle, packet(s) have been placed on the FIFO |
| 0110 | TR | Trigger: Trigger condition has occurred, real PIPESTAT value is on TRACEPKT[3:0] |
| 0111 | TD | Trace disabled: no data on trace port |
| 1000 | PT_IE | Branch phantom taken + IE |
| 1001 | PT_DE | Branch phantom taken + DE |
| 1010 | PT_IN | Branch phantom taken + IN |
| 1011 | PT_DN | Branch phantom taken + DN |
| 1100 | PN_IE | Branch phantom not taken + IE |
| 1101 | PN_DE | Branch phantom not taken + DE |
| 1110 | PN_IN | Branch phantom not taken + IN |
| 1111 | PN_DN | Branch phantom not taken + DN |

1.21.1 Branch Phantom PIPESTATs

The eight new branch phantom encodings are added to account for branch phantoms that are executed in parallel with the following instruction. These encodings should always be interpreted as the branch instruction being first in the execution stream. Only direct branches are predicted, so branch phantoms never place data packets in the FIFO. Folded branches that are mispredicted will result in a normal IE/IN PIPESTAT since any instruction that would have been executed in parallel was from the incorrect instruction stream and was therefore canceled.

1.21.2 Data PIPESTATs

All mnemonics starting with 'D' mean that a data packet of some sort has been placed in the FIFO that cycle and will eventually be output on the TRACEPKT pins. Note that the word 'packet' for the new protocol refers to a multiple byte quantity that is placed in the FIFO rather than a single byte in the FIFO. The data packet may be a branch address, a load/store transfer, a CPRT transfer, or an auxiliary data packet. ETM10 is will place up to a maximum of three data packets in the FIFO in one cycle (two LDST/CPRT transfers and one branch address packet.) Note that three packets in one cycle is a limitation of the hardware, not the protocol. The need for separate data and branch PIPESTATs has been removed by the addition of packet header bytes to the protocol. The addition of DW and DN status values allows a data packet to be attached to any arbitrary cycle. This addition means that coprocessor maps for determining the length of LDCs/STCs are no longer necessary, and tracing of variable length LDC/STC instructions is now supported. Packet header bytes will be described in more detail in section 5.3.

1.21.3 Instriction PIPESTATs

Non-wait PIPESTAT values, i.e. those that indicate an instruction was executed, are always given on the first cycle the instruction is executing. This distinction is important for LSM instructions that execute and return data for several cycles. Note that this behavior is different from previous protocol versions, which would give the executed PIPESTAT value on the LAST cycle the LSM was executed.

"Not executed" PIPESTATs (IN/DN) can occur due to two reasons. Either the instruction has failed its condition codes, or it was not executed due to an exception. As mentioned earlier, posible exceptions include interrupts, prefetch aborts, and reset assertion. Load/store instructions that result in data aborts are not given a IN/DN status since they are considered to have executed. The decompressor needs to know when an exception is preventing an instruction from executing. This information is used to prevent late data packets from a previous LSM instruction from being attached to the exception instruction. (The only data packets allowed for an instruction with a 'not executed' PIPESTAT is a branch address.)

1.21.4 TD Status and TFOs

A status of TD means that trace FIFO data is not present on the TRACEPKT this cycle. There are two reasons why this could occur.

There is no data to be traced in the FIFO (if the FIFO is not empty, the status would be WT) In particular, this will occur shortly after trace is disabled until it is next enabled.

A TFO is being broadcast for ETM synchronization.

When a TD status is given on PIPESTAT, the decompression software will need to look at the TRACEPKT value to determine whether or not a TFO has been broadcast. TRACEPKT[0] is used to differentiate between cycle-accurate, and non-cycle accurate trace as is done in previous ETM implementations. As before, Trace Capture Devices may discard TD cycles where TRACEPKT[0]=0. If TRACEPKT [0] is asserted, TRACEPKT[3:1] is used to specify whether or not a TFO is broadcast. When a TFO is broadcast, TRACEPKT[7:4] specify the lower four bits of the TFO value. TRACEPKT[3:1] specify the remainder of the TFO value as given in the table below. TFOs are encoded in this way to maximize the range of valid TFO values.

| TRACEPKT[3:0] | Description |
| --- | --- |
| XXXXXXX0 | Trace disabled; non-cycle accurate |
| XXXX0111 | Trace disabled; cycle accurate |

-continued

| TRACEPKT[3:0] | Description |
| --- | --- |
| XXXX1001 | TFO value 0–15 (TRACEPKT[7:4] + 0) |
| XXXX1011 | TFO value 16–31 (TRACEPKT[7:4] + 16) |
| XXXX1101 | TFO value 32–47 (TRACEPKT[7:4] + 32) |
| XXXX1111 | TFO value 48–63 (TRACEPKT[7:4] + 48) |
| XXXX0001 | TFO value 64–79 (TRACEPKT[7:4] + 64) |
| XXXX0011 | TFO value 80–95 (TRACEPKT[7:4] + 80) |
| XXXX0101 | Reserved |

A TFO, or Trace FIFO Offset, is used when decompressing the trace information to synchronize between the pipeline status (PIPESTAT) and the FIFO output (TRACEPKT). TFOs are generated whenever trace is first enabled and whenever the instruction synchronization counter reaches zero. Trace FIFO offsets replace the address packet offset (APO) information that was used in previous ETM implementations. Rather than counting branches, TFOs count the number of bytes that are currently in the FIFO. Synchronizing in this manner removes the need for the TRACESYNC pin in the protocol. It also removes the need for starting tracing with a BE PIPESTAT followed by two dead cycles for APO values.

Whenever a TFO is broadcast for synchronization while trace is already enabled, a PIPESTAT value of IE is implied. When TFOs are broadcast to initiate tracing, no PIPESTAT is implied and PIPESTAT for the first traced instruction will be given in the following cycle.

TFOs for synchronization are generated whenever all the following criteria are met:

A cycle counter, typically initialized to 1024, reaches zero

The current instruction has a PIPESTAT value of 'IE'

Once a synchronization request has been indicated, the TFO cycle counter is reset to whatever value has been programmed into the instruction synchronization register (default value is 1024) and begins counting again. In the case where a second synchronization request is made before the first has been serviced, the ETM is forced into overflow as a way to force synchronization to occur. Some trace is lost in this scenario, but this is not thought to be an issue since, if this happens, the processor is most likely stuck in an infinite loop. Therefore, no meaningful trace is lost. The only time this may not be the case is if the synchronization counter is set to some ridiculously low number. Therefore, it is ill advisable to set the synchronization value too low (anything below 50 cycles).

When a TFO cycle occurs, several bytes of data are placed on the FIFO that cycle. This data is referred to as a TFO packet and typically consists of a special header byte, the current CONTEXT ID, and a full instruction address. The proper format for TFO packets is given in section 5.4.

Note that, in the four-bit TRACEPKT configuration, if a TFO occurs when the second nibble of a byte is expected, an extra nibble of value '0x6' is output on TRACEPKT[3:0] immediately following the TFO value. This nibble is required since TFO values specify synchronization in terms of bytes, not nibbles. By outputting this extra nibble, ETM10 guarantees that current top of the FIFO, pointed to by the TFO value, will always be byte aligned. It is important that the decompressor is aware that this extra nibble will appear on TRACEPKT[3:0] for the case where synchronization is not required. The decompressor should always expect this extra nibble whenever a TFO is generated on an odd nibble regardless of whether the TFO is due to synchronization or Trace being enabled. FIFO output is delayed until the complete TFO value (and extra nibble, if required) has been output on TRACEPKT[3:0].

1.21.5 TRIGGER Status

A trigger status (TR) implies that the real four-bit status for this cycle is placed on TRACEPKT[3:0] and FIFO output is delayed by one cycle. This behavior is identical to ETM7 and EMT9. If a trigger and a TFO want to occur at the same time, the PIPESTAT value on TRACEPKT[3:0] will be TD. This is uniquely identifiable as a true TFO since WT pipestats will never be converted to TD pipestats when a trigger occurs. In the four bit port case, if a trigger wants to occur in the second cycle of a TFO broadcast (or the gap cycle), the trigger will occur and the FIFO output will be delayed by an extra cycle to output the remaining TFO nibble(s). Therefore, triggers are never delayed and are guaranteed to be output immediately when generated.

1.22 Packet Header Encodings

Packets are placed in the FIFO due to a PIPESTAT value with the 'D' encoding. Up to three packets (two data packets and one branch address packet) can be placed in the FIFO in a single cycle. Here are the encodings for packet header values:

| Value | Description |
|---|---|
| cXXXXXX1 | Branch address |
| CTT0SS00 | Load Miss data, TT = tag |
| C0AMSS10 | Normal data, A = First data packet (address expected) |
| C1A1TT00 | Load Miss occurred, TT = tag, A = First data packet |
| C1101010 | Value Not Traced |
| C1101110 | Context ID |
| C10MSS10 | Reserved for full-visibility data tracing |
| C111SS10 | Reserved for auxiliary data |
| C1100X10 | Reserved |
| C0x1xx00 | Reserved |

The C bit on a data header is used to inform the decompression tool how many packets are being inserted into the FIFO in a single cycle. The C bit is asserted for each packet inserted up to but not including the last packet. This is necessary for the decompressor to know which packets should be tied to which cycle, and therefore which instruction. This C bit should not be confused with the address continue bit which is indicated by a lower case 'c'.

1.22.1 Branch Address

Branch addresses are encoded in a similar way to previous ETM implementations. A branch packet can still be one to five bytes long, and the decompression tool should expect more bytes whenever the c bit is enabled. However, bit zero of a branch address is no longer used to differentiate between Thumb and ARM state. Instead, all branch addresses are prefixed, pre-compression, with a one in $33^{rd}$ bit position. Once compressed, all branch addresses are suffixed with a one in the $0^{th}$ bit position. The one in bit zero identifies the packet as a branch address, and the one in bit 33 is used to help distinguish between ARM and thumb addresses. Since ARM addresses must be word aligned, only bits [31:2] of an ARM address are broadcast. Thumb addresses are half-word aligned and therefore need only broadcast bits [31:1]. Broadcasting a different number of bits for ARM and Thumb addresses combined with having the $33^{rd}$ bit always asserted pre-compression guarantees that a full five byte address will be broadcast on a transition between ARM and Thumb state. Furthermore, ARM and Thumb address can always be uniquely identified by the high order bits of the fifth address byte, as shown in the following table:

| ARM 5 byte address | Thumb 5 byte address |
|---|---|
| 1XXXXXX1 | 1XXXXXX1 |
| 1XXXXXXX | 1XXXXXXX |
| 1XXXXXXX | 1XXXXXXX |
| 1XXXXXXX | 1XXXXXXX |
| 0E001XXX | 0E01XXXX |

If present, a branch target address will always be the last item to be placed into the FIFO on a given cycle. Therefore, a packet continuation bit (C bit) is not required. Reasons codes are no longer broadcast on address bits 6:4 in the $5^{th}$ byte since they are now given as part of the TFO packet header, which is discussed in section 5.4. Bit 6 of the $5^{th}$ byte is used to indicate an exception branch address (indicated by an 'E' in the table above). This bit is set on any branch due to an abort, interrupt, or soft reset. This is useful so that the decompressor can recognize, and indicate to the user, that these interrupted instructions were not actually executed. Bit 7 and Bit 5 of the fifth address byte remain reserved for future use.

1.22.2 Normal Data

The normal data header is used for all loads that do not miss in the cache and for store data packets. It is also used for CPRT data packets if CPRT data tracing is enabled. If data address tracing is enabled, the data address will be broadcast after the header packet and before the data value, if present. Data addresses are broadcast using the same compression technique as instruction branch addresses and therefore consist of one to five bytes. As is true for previous ETM implementations, whether or not data addresses are traced must be statically determined before tracing begins. If two normal data packets are given in a single cycle (due to a 64 bit data transfer) only the first packet will contain a data address. When data for LSM instructions are broadcast, the data address is only broadcast with the first data packet, even though subsequent data packets will be transferred in different cycles. The 'A bit in the normal data header is used to specify that this is the first data packet for a particular instruction, and therefore a data address should be expected (if address tracing is enabled). Having this information available in the header byte allows the decompressor to maintain synchronisation when tracing through sections of code which are not decompressable (i.e. any region for which a binary is not available). The 'A' bit is not asserted on CPRT packets.

The 'MSS' bits in the normal data encoding are used for data value compression. When the M bit is low, the SS bits specify the size of the data value transferred. Leading zeros are removed from the value as a simple form of data compression. Preliminary experiments show this compression technique yields about 20–30% compression, which is enough to offset the additional bandwidth cost of the header byte. Encodings with the M bit set are reserved for future compression techniques. The exact encodings for the MSS bits are given in the following table:

| Encoding | Description |
| --- | --- |
| 000 | Value == 0, no data bytes follow |
| 001 | Value < 256, one data byte follows |
| 010 | Value <65536, two data bytes follow |
| 011 | No compression done, four data bytes follow |
| 1xx | Reserved for future compression techniques |

1.22.3 Load Miss

The Load Miss Occurred and Load Miss Data header types handle load requests that miss in the data cache. When a load miss occurs, a Load Miss Occurred packet is placed in the FIFO where the data value is expected. If data address tracing is enabled, the packet will include the data address. Otherwise, the packet will consist of just the Load Miss Occurred header byte. When a Load Miss Occurred packet is read, the decompression software will then know that the data value is now an outstanding miss, and it will be returned later. Once the data is returned, the PIPESTAT value for that cycle will be modified to the '+DATA' version and the Load Miss Data packet, consisting of the Load Miss Data header byte and the actual data value, will be placed in the FIFO. The Load Miss Data packet will never include a data address. Since the load/store unit must have a free cycle to return Load Miss data, this data will never be returned in the same cycle as data for another load or store request.

The 'TT' bits in the Load Miss header types are used as a tag to identify each load miss. The Load Miss Occurred packet will always have the same tag value as it's corresponding Load Miss Data packet. ARM1020E only supports one outstanding Load Miss at a time, but a second load miss packet may be broadcast before data for the first miss is returned. Therefore, to uniquely identify all load misses, tag values 2'b00 and 2'b01 are supported on ETM10 rev 0. Two bits have been allocated to the tag field to support future processors that may allow more outstanding misses. Furthermore, although ARM1020E will always return miss data in order (relative to other load misses), this tagging mechanism will support future processors that may return miss data out-of-order.

When a miss occurs on a 64 bit load value, two Load Miss packets are placed in the FIFO in the same cycle. The decompressor will know that these two misses are for a single 64 bit value since both packets will have the same tag value and they will be placed in the FIFO in the same cycle. As with normal data packets, the data address will only be present with the first Load Miss packet, and will not be present at all if the miss occurs in the middle of an LSM that has already broadcast data packets.

When Load Miss data is returned for the 64 bit case, it is always returned as two separate Load Miss Data packets given in the same cycle. Both packets will have the same miss tag.

Load miss data packets use the MSS bits for size information and data compression as is done for normal data. If the decompressor receives an unexpected Load Miss data packet (i.e. a miss data packet is given without a pending miss occurred packet with the same tag), it should skip over the specified number of bytes given in the size. If trace is disabled before the outstanding miss data is returned then this data item will be placed in the FIFO with a 'DW' PIPESTAT as soon as it's available. If trace is enabled with a reason code of overflow or exited debug, the decompressor should cancel any pending Load Miss packets.

1.22.4 Auxiliary and Full-Visibility Data Tracing

The auxiliary and full-visibility data header encodings are reserved slots set aside for expandability in the protocol. It is possible that these packet types will be used for tracing auxiliary data both internal and external to the processor (Full-Visibility refers to tracing all register file updates). Like other data packets, auxiliary data packets utilise the SS bits for size information. Full-Visibility data tracing supports the M bit for further compression as well. These packet types will not be used on ETM10 rev 0.

1.22.5 Context ID

The Context ID header byte is only used when the Context ID is modified via the Context ID update instruction: MCR c15, 0, rd, c13, c0, 1. The size of the data value is statically determined by the Context ID size specified in the ETM10 control register (register 0x0, bits [15:14]) Only the number of bytes specified will be traced even if the new value is larger than the number of bytes specified. If the size is specified as zero, then Context ID updates will not be traced. Note that even though the Context ID update instruction is an MCR, Context ID value tracing is completely independent from tracing data values from other CPRT instructions. It is not affected by the Monitor CPRT bit in the ETM10 control register (register 0x0, bit [1]). Using a unique header value for Context ID updates allows the decompressor to recognize Context ID changes even when tracing through code regions which are not decompressable (i.e. any region for which a binary is not available).

1.22.6 Value not Traced

Previous ETM implementations have only been able to trace either all or none of the data values for an LSM operation, and this decision has been made at the time of the first transfer. Since today's compilers will often combine adjacent LDR/STR operations into an LSM unbeknownst to the user, this behaviour is undesirable. With the addition of Value Not Traced packets, we have added the ability to partially trace an LSM and only output the data values that exactly match the trigger criteria.

Whenever the first data value associated with an LSM is traced, a normal data packet is placed in the FIFO containing the data address (if address tracing is enabled) and the data value (if data value tracing is enabled). All subsequent data transfers for this LSM will result in a packet being placed in the FIFO. If subsequent values are traced, then a normal data packet, giving the data value only, will be traced. If subsequent data transfers should not be traced, then Value Not Traced packets will be placed on the FIFO for these transfers. Value Not Traced packets consist of only the Value Not Traced header byte. The decompression software can then use the Value Not Traced packets in combination with the normal data packets to determine which LSM values were traced and which were not by working backwards from the final data transfer.

Note that, as stated earlier, once tracing begins on a LSM instruction, it will continue until the LSM completes, even if TraceEnable is deasserted before the instruction completes.

1.22.7 Reserved

There are a total of ten reserved slots remaining in the data header encodings. All of these slots are made available for enhancements to the protocol as required and/or for use by future ETM implementations. The M bit in the Normal Data and Full-Visibility Trace encodings could also be used for new data header encodings instead of compression if even more header types are required by future ETM implementations.

1.23 TFO Packet Header Encodings

TFO packets are placed in the FIFO by a TFO cycle (described in Section 5.2.4). Since the decompressor will know when a packet is placed in the FIFO by a TFO, TFO packets have their own header byte encodings, which are completely independent from the encoding space used by PIPESTAT data packets. Here are the TFO packet header encodings:

| Value | Description |
|---|---|
| XXXXXX00 | ARM Instruction address |
| XXXXXXX1 | Thumb Instruction address |
| 0RR00010 | Normal TFO packet |
| 1RR00010 | LSM in progress TFO packet |
| XXXXX110 | Reserved |
| XXXX1010 | Reserved |
| XXX10010 | Reserved |

1.23.1 Instruction Address

If TRACEPKT[1:0]!=2'b10 for the first byte of a TFO packet, then this TFO packet consists of just an instruction address. Since a full address is always required, no compression is attempted and the address is always output as a four-byte value. Bit 0 of the address specifies whether it is a Thumb or an ARM instruction address. When a TFO packet consist of just the instruction address, this implies:

CONTEXT ID values are not traced (determined by ContextIDSize, ETM Control register bits [15:14])

The TFO reason code is 2'b00, normal synchronization

If the reason code is non-zero or a CONTEXT ID value is being traced, then one of the following TFO packets is required. TFO packets consisting of just an address are not strictly required for protocol compliance and will not be implemented on ETM10 rev 0.

1.23.2 Normal TFO Packet

Normal TFO packets consist of a header byte followed by 0 to 4 bytes of CONTEXT ID, followed by a 4-byte instruction address. The number of CONTEXT ID bytes traced is statically determined by ETM Control register bits [15:14]. The instruction address is always four bytes and is not compressed. Bit 0 specifies the Thumb bit. The TFO header byte contains the two-bit reason code (labeled as RR in the table above). These reason codes are consistent with the ones used by ETM7 and ETM9 in protocol versions 0 and 1. The reason codes are given in the following table:

| Value | Description |
|---|---|
| 00 | Normal synchronization |
| 01 | Tracing has been enabled |
| 10 | Trace restarted after overflow |
| 11 | ARM has exited from debug state |

1.23.3 LSM in Progress TFO Packet

LSM in Progress packets occur only when trace is enabled in the middle of a multiple memory access instruction (LDM, STM, LDC, or STC), and another instruction is currently executing. These packets consist of a header byte followed by 0 to 4 bytes of CONTEXT ID, followed by a 4 byte instruction address for the LSM, followed by 1 to 5 bytes of compressed address for the instruction currently executing. The LSM instruction is a fixed four-byte address with bit 0 specifying the Thumb bit. The current instruction address is compressed using the same technique as branch addresses. (as specified in section 5.3.1) The final instruction address is compressed relative to the full address from the LSM instruction. The next instruction PIPESTAT will be for the instruction pointed to by the second address and tracing begins in the normal way from this point forwards. This packet type is necessary for properly tracing all instructions that touch a particular data address or data value. Without it, the LSM instruction could not be properly traced based on the data address. Note that instructions occurring underneath the LSM are traced, even if tracing was programmed to turn on only during the LSM itself. Similarly, if tracing is turned on due to the instruction address of an instruction that just happens to execute underneath an LSM, a LSM in Progress TFO packet will still be output. For further clarity of the differences between the Normal TFO packet and the LSM in Progress TFO packet, the following table expresses the bytes that should be expected for each case:

| Normal TFO Packet | LSM in Progress TFO Packet |
|---|---|
| Normal Header (1 byte) | LSM in Progress header (1 byte) |
| Context ID (0–4 bytes) | Context I (0–4 bytes) |
| Instruction Address (4 bytes) | LSM Address (4 bytes) |
| N/A | Instruction Address (0–5 bytes) |

ARM10 Trace Interface

This section describes the signal interface between ARM1020E and ETM10. The majority of the interface is driven by ARM1020E into ETM10. Signal descriptions are divided into custom datapath inputs, synthesised control inputs, and ETM outputs. Synthesised control signals can be changed later, but datapath signal changes require custom logic rework and, therefore, these cannot be changed late in the design. All input signals are registered immediately inside ETM10 and all outputs are driven directly from the output of a register. The interface consists of a total of 220 signals, which includes 213 inputs and 4 outputs from an ETM10 perspective.

1.24 ETM Datapath Inputs

There are four data buses of interest for ETM data tracing: load data, store data, MCR data, and MRC data. All four of these buses are 64 bits in width. Since it is only possible for one of these buses to contain valid data in any given cycle, all four buses are muxed down within ARM1020E to one 64 bit data bus, ETMDATA. ETMDATA is registered within ARM1020E before it is driven to the ETM. ETMDATA is valid in the write (WR) stage of the ARM1020E pipeline. There are four address buses driven from ARM1020E to ETM10. Three of these buses are for instruction addresses and one is for data addresses. The R15 buses are driven to ETM in the execute (EX) stage of the ARM1020E pipeline while the IA and DA address buses are valid in the memory (ME) stage. All datapath buses driven to ETM are given in the following table.

| Signal name | Description |
|---|---|
| ETMDATA[63:0] | Contains the data value for a Load, Store, MRC, or MCR instruction |
| DA[31:0] | Data address bus. Gives the address for every load or store transaction |

-continued

| Signal name | Description |
|---|---|
| IA[31:1] | Instruction address bus. Gives the address for every instruction fetch. |
| R15BP[31:1] | Address for the branch phantom currently in execute |
| R15EX[31:1] | Address for the instruction currently in execute |

1.25 ETM Control Inputs

1.25.1 ETMCORECTL[23.0]

ETMCORECTL includes a wide variety of control signals that all come from the ARM10 core. These signals are all registered within the core and combined onto this common bus before they are driven to ETM10. The control signals present on this bus and their meaning is given in the following table. All of these are valid in the write stage (WR) of the ARM1020E pipeline, unless specified otherwise.

| Signal name | Description | Qualified by |
|---|---|---|
| ForcePF | Current address on the IA bus is a target for an indirect branch | None |
| ITBit | Thumb Bit for current instruction fetch (valid in ME) | IMnREQ/ForcePF |
| InMREQ | Current address on the IA bus is for a valid instruction fetch | None |
| UpdatesCONTEXT ID | Current instruction is updating the CONTEXT ID. | InstValid |
| R15Hold | Stall signal for the address given on R15EX. | None |
| BpValid | When asserted, a branch phantom is present in execute | None |
| BpCCFail | Branch phantom failed it's condition codes | BpValid |
| InstValid | Asserted once per executed instruction. Takes into account mispredicted branches | None |
| CCFail | Current instruction failed it's condition codes | InstValid |
| LSCMInit | Current instruction is a LSM instruction | InstValid |
| Exception | Current instruction is an exception (interrupt, reset, or abort) | InstValid |
| ETMBranch | Last instruction executed is an indirect branch | Asserted before or coincident ForcePF |
| TbitEx | Asserted when ARM1020E is in thumb state (valid in ME) | InstValid |
| PreLoad | Current instruction is a preload and should not be traced | InstValid |
| DnMREQ | Qualifies the Data Address bus, DA | None |
| DMAS[1:0] | Load or store data size | DnMREQ |
| ETMSwap | Indicates a 64 bit store to a big endian memory device. | DnMREQ |
| DnRW | data request read/write signal (0 == read) | DnRW |
| HUMACK | Valid load miss data is present on the data bus this cycle | None |
| LSCM | LSM is in progress in the Load/Store Unit | DnMREQ |
| DABORT | Data request aborted | DnMREQ |
| MISSCNT[1:0] | How many load misses are outstanding. | None, transitions indicate new miss |

1.25.2 ETMDATAVALID[1.0]

This signal qualifies the data driven on the bus ETM-DATA[63:0]. There is one bit for each half of the data bus.

1.26 ETM Outputs

This section describes the outputs that feed back into ARM1020E and what is required from ARM1020E

1.26.1 FIOFULL

When enable, the ETM output FIFOFULL is asserted whenever there are bytes placed in the FIFO, and it remains asserted until the FIFO is empty. This behaviour is slightly different from ETM7/9, which waited until the FIFO reached a certain specified level before asserting FIFOFULL (see section 4.16) FIFOFULL is used by the core, in this case ARM1020E, to stall the ARM pipeline. This prevents ETM overflow, thus guarantees a complete trace with the side effect of changing slightly the timing of events happening in the core. Note that due to timing considerations, the assertion of FIFOFULL will not result in the immediate stalling of ARM1020E. Therefore, it is sometimes possible, though rare, to still have an overflow even when FIFOFULL is asserted. When this happens, the number of instructions missed will be small since the processor will remained stalled (due to FIFOFULL assertion) while the FIFO is draining.

1.26.2 PWRDOWN

When HIGH this indicates that the ETM is not currently enabled, so the CLK input can be stopped. This is used to reduce power consumption when trace is not being used. At reset PWRDOWN will be asserted until the ETM10 has been programmed. The ARM10200 testchip should use the PWRDOWN output directly to gate the ETM10 CLK input. As previously noted, PWRDOWN will be temporarily disabled on a CONTEXT ID update to allow for an update on ETM10's internal CONTEXT ID shadow register. Except for the CONTEXT ID update case, PWRDOWN is changed synchronously to TCLK and will be cleared by the ARM debug tools at the start of a debug session. Since PWRDOWN changes many cycles before trace is enabled, using a TCLK based signal to gate the ETM10 CLK does not cause any metastablilty problems.

1.26.3 DBGRQ

Like previous ETM implementations, ETM10 can be programmed to assert DBGRQ whenever the trigger condition occurs. DGBRQ will remain asserted until DGBACK is observed. DBGRQ should be connected to the ARM1020E external debug request pin, EDBGRQ. No extra support from ARM1020E is required for this ETM output. If the EDBGRQ input is already in use by some other functional block in the ASIC, the multiple DGBRQ signals can be ORed together. Note that enabling debug in this manner is not guaranteed to fall on any particular instruction boundary. Furthermore, the core only recognizes EDGBRQ if ARM10 is currently in hardware debug mode.

1.26.4 TDO

ETM10 uses the same TAP interface wiring as previous ETM versions. The TDO pin is connected to the ARM1020E scan expansion input SDOUTBS. ETM10 registers are accessed via scan chain 6 and are programmed in a manner identical to previous ETM implementations. No extra support from ARM1020E is required for this ETM output.

CONFIGURATIONS

ETM7/9 have been made available in small, medium, and large configurations. Medium and large configurations offer more trigger hardware resources and increased FIFO depth at the cost of additional area. Different configurations can be chosen for different ASIC applications by simply resynthesising the soft macro with the new configuration. ETM10 will offer a similar range of configurations. The following table presents the configurations currently proposed for ETM10. Most trigger resources are identical to ETM7 and ETM9 with the exception of data comparators in the large configuration which was decreased from 8 to 4 due to the larger size of the 64 bit comparators. Increased FIFO sizes in each configuration reflect the need to support the higher instruction throughput (i.e. performance) of ARM1020E. FIFO sizes for each configuration may increase based on area impact and feedback from performance modelling. The gate counts given for ETM10 configurations are estimates based on the initial synthesis of the ETM10 rtl model. These estimated gate counts are likely to be different than what is achieved in the final implementation. A large size ETM10 is what will be placed on the ARM10200 testchip. The corresponding number of resources for ETM9 in each category is given in parentheses for comparison.

| Resource type | Small ETM10 (ETM9) | Medium ETM10 (ETM9) | Large ETM10 (ETM9) |
| --- | --- | --- | --- |
| Pairs of address comparators | 1 (1) | 4 (4) | 8 (8) |
| Data comparators | 0 (0) | 2 (2) | 4 (8) |
| Memory map decoders | 0 (4) | 0 (8) | 0 (16) |
| CONTEXT ID comparators | 0 (0) | 1 (0) | 3 (0) |
| Sequencers | 0 (0) | 1 (1) | 1 (1) |
| Counters | 1 (1) | 2 (2) | 4 (4) |
| External inputs | 2 (2) | 4 (4) | 4 (4) |
| External outputs | 0 (0) | 1 (1) | 4 (4) |
| FIFO depth | 15 (9) | 30 (18) | 60 (45) |
| Trace packet width | 4/8/16 (4/8) | 4/8/16 (4/8/16) | 4/8/16 (4/8/16) |
| Approximate Gate count | 35k (25k) | 50k (35k) | 75k (60k) |
| Approximate Area (0.25 process) | 1.8 mm² (1.1 mm²) | 2.3 mm² (1.58 mm²) | 4.7 mm² (3.1 mm²) |
| Approximate Area (0.18 process) | 1.0 mm² (0.62 mm²) | 1.26 mm² (0.9 mm²) | 2.5 mm² (1.7 mm²) |

We claim:

1. Apparatus for processing data, said apparatus comprising:
 (i) a processing circuit operable to process data values under control of processing instructions;
 (ii) a memory operable to store data values to be processed, said processing circuit being responsive to a data access instruction to access a data value stored within said memory; and
 (iii) a tracing circuit operable to generate a stream of trace data identifying processing instructions executed and data values accessed by said processing circuit; wherein
 (iv) a data access instruction may result in a data miss such that a data value corresponding to said data access instruction is accessed upon a processing cycle subsequent to that upon which said access would occur without said data miss; and
 (v) said tracing circuit is responsive to said data miss to generate a data place holder within said stream of trace data at a position where data identifying said data value would have been placed if said data miss had not occurred and then, when said access to said data value does occur, to insert at a later point in said stream of trace data a late data value identifying said data value.

2. Apparatus as claimed in claim 1, wherein said memory comprises a cache memory and a main memory, a data miss occurring when a data value being accessed is not stored within said cache memory.

3. Apparatus as claimed in claim 1, wherein said data place holder includes a tag value and said late data value includes a matching tag value.

4. Apparatus as claimed in claim 3, wherein when a plurality of data misses result in a plurality of data place holders being generated, late data values may be generated in a different order than their corresponding data misses.

5. Apparatus as claimed in claim 1, wherein said data place holder includes data identifying how many outstanding late data values are awaited at that time.

6. Apparatus as claimed in claim 1, wherein said stream of trace data includes periodic synchronizing data, said synchronizing data including data identifying how many outstanding late data values are awaited at that time.

7. Apparatus as claimed in claim 1, wherein said tracing circuit is operable to control tracing operation in response to a trigger condition associated with one or more of said data value and a memory address associated with said data value.

8. Apparatus as claimed in claim 7, wherein said tracing circuit is responsive to an exact match signal such that a trigger condition associated with a data value for which a data miss occurs is either:
 (i) not triggered until said data value is accessed and found to meet said trigger condition; or
 (ii) triggered upon said data miss upon an assumption that said data value when accessed will meet said trigger condition.

9. Apparatus as claimed in claim 8, wherein said exact match signal is user configurable.

10. Apparatus as claimed in claim 8, wherein said exact match signal is set under hardware control depending upon a use of said trigger condition.

11. Apparatus as claimed in claim 8, wherein said exact match signal has different values in different parts of said tracing circuit to simultaneously provide behaviors whereby said tracing circuit is responsive to an exact match signal such that a trigger condition associated with a data value for which a data miss occurs is either:
 (i) not triggered until said data value is accessed and found to meet said trigger condition; or
 (ii) triggered upon said data miss upon an assumption that said data value when accessed will meet said trigger condition.

12. A method of processing data, said method comprising the steps of:
 (i) processing data values under control of processing instructions;
 (ii) storing data values to be processed, a data access instruction being operable to access a stored data value; and
 (iii) generating a stream of trace data identifying processing instructions executed and data values accessed; wherein
 (iv) a data access instruction may result in a data miss such that a data value corresponding to said data access instruction is accessed upon a processing cycle subsequent to that upon which said access would occur without said data miss; and
 (v) in response to said data miss, generating a data place holder within said stream of trace data at a position where data identifying said data value would have been placed if said data miss had not occurred and then, when said access to said data value does occur, inserting at a later point in said stream of trace a late data value identifying said data value.

13. A computer program product encoded on a recording medium carrying out a computer program for controlling a data processing apparatus to analyze a stream of trace data generated in accordance with the method of claim 12.

14. Apparatus for processing data, comprising:
means for processing data values under control of processing instructions;
means for storing data values to be processed, said processing means being responsive to a data access instruction to access a data value stored within said memory means;
means for generating a stream of trace data identifying processing instructions executed and data values accessed by said processing circuit; and
means for accessing a data value corresponding to a data access instruction resulting in a data miss at a processing cycle subsequent to that at which said access would occur without said data miss;
wherein the means for generating is responsive to said data miss to generate a data place holder within said stream of trace data at a position where data identifying said data value would have been placed if said data miss had not occurred and then, when said access to said data value does occur, to insert at a later point in said stream of trace data a late data value identifying said data value.

15. Apparatus as claimed in claim 14, wherein said means for storing comprises a cache memory and a main memory, a data miss occurring when a data value being accessed is not stored within said cache memory.

16. Apparatus as claimed in claim 14, wherein said data place holder includes a tag value and said late data value includes a matching tag value.

17. Apparatus as claimed in claim 14, wherein when a plurality of data misses result in a plurality of data place holders being generated, late data values may be generated in a different order than their corresponding data misses.

18. Apparatus as claimed in claim 14, wherein said data place holder includes data identifying how many outstanding late data values are awaited at that time.

19. Apparatus as claimed in claim 14, wherein said stream of trace data includes periodic synchronizing data, said synchronizing data including data identifying how may outstanding late data values are awaited at that time.

20. Apparatus as claimed in claim 14, wherein said means for generating is a tracing circuit operable to control a tracing operation in response to a trigger condition associated with one or more of said data value and a memory address associated with said data value.

21. Apparatus as claimed in claim 20, wherein said means for generating is responsive to an exact match signal such that a trigger condition associated with a data value for which a data miss occurs is either:
(i) not triggered until said data value is accessed and found to meet said trigger condition; or
(ii) triggered upon said data miss upon an assumption that said data value when accessed will meet said trigger condition.

22. Apparatus as claimed in claim 21, wherein said exact match signal is user configurable.

23. Apparatus as claimed in claim 21, wherein said exact match signal is set under hardware control depending upon a use of said trigger condition.

24. Apparatus as claimed in claim 21, wherein said exact match signal has different values in different parts of said means for generating to simultaneously provide behaviors whereby said means for generating is responsive to an exact match signal such that a trigger condition associated with a data value for which a data miss occurs is either:
(i) not triggered until said data value is accessed and found to meet said trigger condition; or
(ii) triggered upon said data miss upon an assumption that said data value when accessed will meet said trigger condition.

* * * * *